US008249345B2

(12) United States Patent
Wu et al.

(10) Patent No.: US 8,249,345 B2
(45) Date of Patent: Aug. 21, 2012

(54) AUTOMATIC IMAGE SEGMENTATION USING CONTOUR PROPAGATION

(75) Inventors: Min Wu, Davie, FL (US); Louis K. Arata, Mentor, OH (US)

(73) Assignee: MAKO Surgical Corp., Fort Lauderdale, FL (US)

( * ) Notice: Subject to any disclaimer, the term of this patent is extended or adjusted under 35 U.S.C. 154(b) by 1035 days.

(21) Appl. No.: 12/147,997

(22) Filed: Jun. 27, 2008

(65) Prior Publication Data

US 2009/0324078 A1 Dec. 31, 2009

(51) Int. Cl.
*G06K 9/46* (2006.01)
(52) U.S. Cl. ..................... 382/173; 382/100; 382/154
(58) Field of Classification Search .................. 382/173, 382/100, 154
See application file for complete search history.

(56) References Cited

U.S. PATENT DOCUMENTS

| | | | |
|---|---|---|---|
| 5,390,291 A | 2/1995 | Ohashi | |
| 5,995,115 A | 11/1999 | Dickie | |
| 6,385,332 B1 | 5/2002 | Zahalka et al. | |
| 6,606,091 B2 | 8/2003 | Liang et al. | |
| 6,937,760 B2 | 8/2005 | Schoepflin et al. | |
| 2007/0253617 A1 | 11/2007 | Arata et al. | |

OTHER PUBLICATIONS

Farag et al., "Edge Linking by Sequential Search," *Pattern Recognition*, 28(5):611-633 (1993).
Martín et al., "Energy Functions for the Segmentation of Ultrasound Volume Data Using Active Rays," *IEEE*:2274-2277 (2000).
Martín-Fernández et al., "An approach for contour detection of human kidneys from ultrasound images using markov random fields and active contours," *Medical Image Analysis*, 9:1-23 (2003).
Wolf et al., "ROPES: A Semiautomated Segmentation Method for Accelerated Analysis of Three-Dimensional Echocardiographic Data," *IEEE Transactions on Medical Imaging*, 21(9):1091-1104 (2002).
International Search Report and Written Opinion for International Application No. PCT/US2008/068582, Date of Mailing Jun. 6, 2009 (19 pages).
Christiansen et al., "Conversion of Complex Contour Line Definitions Into Polygonal Element Mosaics," *Proceedings of the 59th Annual International Conference on Computer Graphics and Interactive Techniques*, pp. 187-192 (Dec. 31, 1978).
Cook et al., "Three-Dimensional Reconstruction From Serial Sections for Medical Applications," *Proceedings of 14th Hawaii International Conference on Systems Sciences*, 2:pp. 358-389 (Dec. 31, 1981).

(Continued)

*Primary Examiner* — Matthew Bella
*Assistant Examiner* — Ruiping Li
(74) *Attorney, Agent, or Firm* — Foley & Lardner LLP

(57) ABSTRACT

Described are computer-based methods and apparatuses, including computer program products, for automatic image segmentation using contour propagation. A path metric of a candidate piece of a contour in a cross-sectional image is calculated to generate a three dimensional model using a plurality of cross-sectional images of an object. Data indicative of the cross-sectional image is stored. A cost of each of a plurality of pixels associated with the candidate piece is calculated using the data, wherein the cost is representative of a likelihood the pixel is on the contour and the cost is based on one or more templates. An orientation change value is calculated for each of the plurality of pixels associated with the candidate piece based on an initial pixel of the candidate piece and the pixel. A ratio of pixels is calculated. The path metric of the candidate piece of the contour is stored, the value of the stored path metric being based on the calculated cost, the calculated orientation change value, and the calculated ratio.

23 Claims, 23 Drawing Sheets

OTHER PUBLICATIONS

Ekoule et al., "A Triangulation Algorithm from Arbitrary Shaped Multiple Planar Contours," *ACM Transactions on Graphics*, 10(2):pp. 182-199 (1991).

Falcão et al., "An Ultra-Fast User-Steered Image Segmentation Paradigm: Live Wire on the Fly," *IEEE Transactions on Medical Imaging*, 19(1):pp. 55-62 (2000).

Fuchs et al., "Optimal Surface Reconstruction from Planar Contours," *Communications of the ACM*, 20(10):pp. 693-702 (1977).

Kass et al., "Snakes: Active Contour Models," *International Journal of Computer Vision*, pp. 321-331 (1988).

Keppel, E., "Approximating Complex Surfaces by Triangulation of Contour Lines," *IBM J. Res. Develop.*, pp. 2-11 (1975).

International Search Report for PCT Application No. PCT/US2007/08810 mailed on Nov. 6, 2007 (3 pgs).

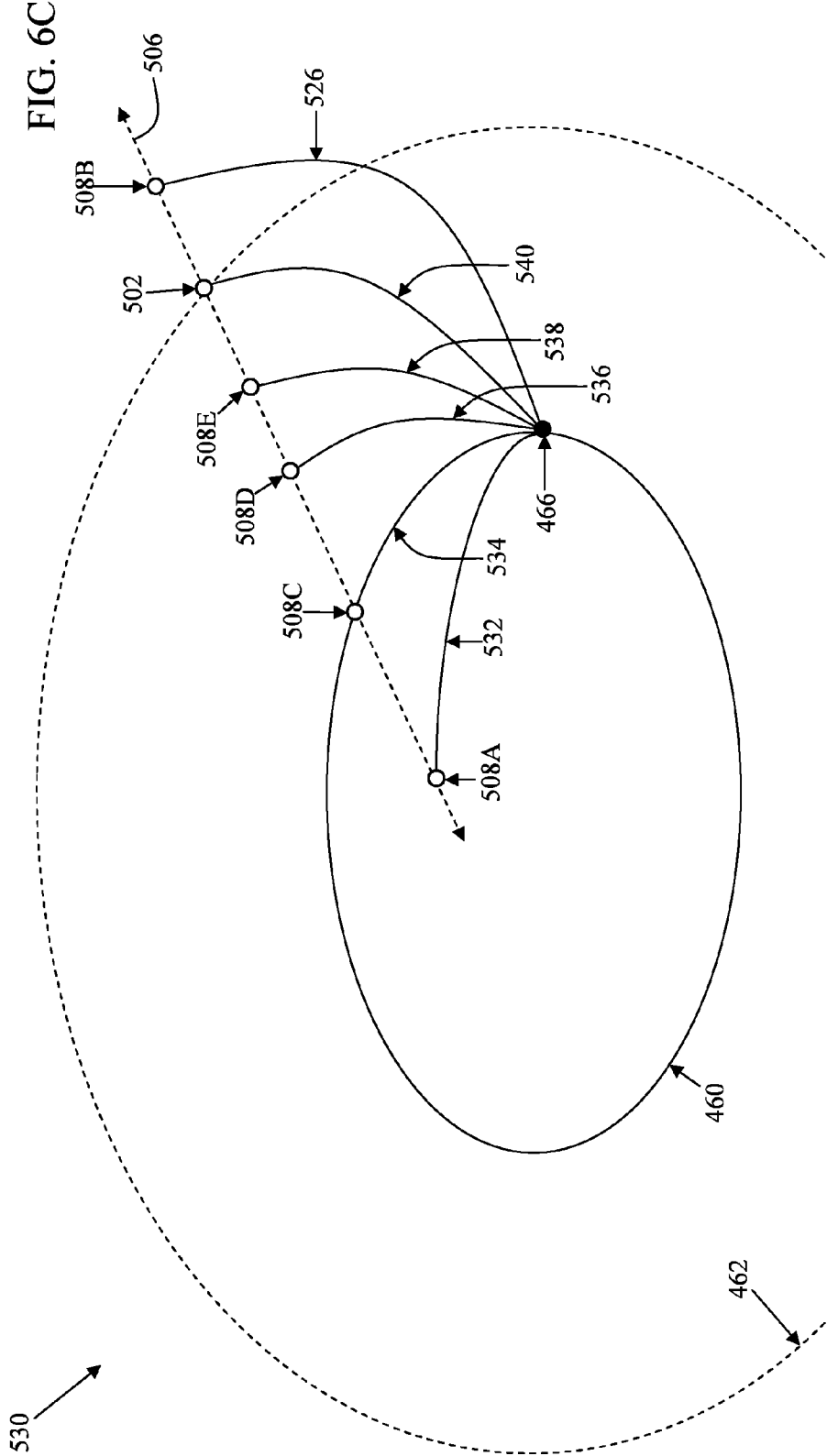

AUTOMATIC IMAGE SEGMENTATION USING CONTOUR PROPAGATION

FIELD OF THE INVENTION

The present invention relates generally to computer-based methods and apparatuses, including computer program products, for automatic image segmentation using contour propagation.

BACKGROUND

In image-guided therapy, such as image-guided surgery and radiation therapy planning, an accurate 3D model of human anatomy (e.g., bone, tumors, tissues, etc.) is extremely important. Cross-sectional images (commonly referred to as "slices") of anatomical objects can be obtained using Computed Tomography (CT), Magnetic Resonance Imaging (MRI), ultrasound, and other imaging techniques. A general approach for constructing a 3D model surface of the imaged object is to connect a series of contours of human anatomy on a set of parallel or substantially parallel image slices. Image segmentation on parallel slices is typically a very time consuming task. For example, for a knee application, a user may need to segment over 80 slices, which can take 40 minutes to manually complete. Automatic segmentation of as many slices as possible can reduce the completion time.

Interactive segmentation can be used for difficult segmentation tasks in image-guided therapy. "Live Wire" and "Active Contour" are two interactive segmentation techniques. Active Contour (or Snakes) is based on constructing a cost function to measure the appropriateness of a contour, wherein the best solution corresponds to the path with the lowest cost function value. In a discrete case, the contour is approximated by control points at equal intervals around a structure. However, Active Contour is limited in ability to find contours in images. Initial control points are placed around the contour, but the initial control points are only an estimate of the contour, and additional information is required to find a true contour. Active Contour is sensitive to the initial placement of control points, which have to be placed near a contour of interest to work correctly. Additionally, the local minimum of the cost function may not coincide with a correct contour.

For difficult situations, Live Wire can be used without compromising the accuracy of the segmentation. Live Wire requires a user to manually enter the control points (e.g., by clicking a computer mouse to enter each point) for each contour. For example, for 80 slices, if each slice has 18 control points, the user has to click the mouse 1,440 times. In addition to the time required to manually enter control points, Live Wire may experience what is referred to as a "boundary snapping problem." When one slice has two adjacent contours, a boundary pixel of a second adjacent contour may have a higher cost function than a boundary pixel of a first contour, and thus if the user attempts to select a pixel on the boundary of the first contour, the higher cost of a pixel on the boundary of the second contour may result in the pixel being snapped to a boundary edge of the second contour instead of the first contour. Boundary snapping can result in an erroneous Live Wire segment unless the user selects more control points to circumvent this boundary snapping problem.

SUMMARY OF THE INVENTION

The techniques described herein provide methods and apparatuses for automatically segmenting contours on parallel images using contour propagation. Such automatic segmentation facilitates entering a single set of contour control points and automatically propagating the contours over parallel images.

In one aspect, there is a method. The method is a computerized method for calculating a path metric of a candidate piece of a contour in a cross-sectional image to generate a three dimensional model using a plurality of cross-sectional images of an object. The method includes storing data indicative of the cross-sectional image. A cost of each of a plurality of pixels associated with the candidate piece is calculated using the data, wherein the cost is representative of a likelihood the pixel is on the contour and the cost is based on one or more templates. An orientation change value is calculated for each of the plurality of pixels associated with the candidate piece based on an initial pixel of the candidate piece and the pixel. A ratio of pixels is calculated. The path metric of the candidate piece of the contour is stored, the value of the stored path metric being based on the calculated cost, the calculated orientation change value, and the calculated ratio.

In another aspect, there is a method. The method is a computerized method for calculating an optimal candidate piece of a contour in a cross-sectional image to generate a three dimensional model using a plurality of cross-sectional images of an object. The method includes receiving data indicative of a first cross-sectional image and a second cross-sectional image adjacent to the first cross-sectional image, the first cross-sectional image and second cross-sectional image being in the plurality of cross-sectional images. Using the data, a plurality of paths is calculated between a first point and a second point in the second cross-sectional image based on a lowest cost function. The method further includes calculating a path metric for each path in the plurality of paths based on a path metric function, the path metric function being different from the lowest cost function. The optimal candidate piece from the plurality of paths is determined, the optimal candidate path having a highest path metric among the plurality of paths. Data indicative of the optimal candidate piece of the contour is stored.

In another aspect, there is a system. The system calculates a path metric of a candidate piece of a contour in a cross-sectional image to generate a three dimensional model using a plurality of cross-sectional images of an object. The system includes a processor configured to calculate a cost of each of a plurality of pixels associated with the candidate piece using data indicative of the cross-sectional image, wherein the cost is representative of a likelihood the pixel is on the contour and is based on one or more templates. The processor is further configured to calculate an orientation change value for each of the plurality of pixels associated with the candidate piece based on an initial pixel of the candidate piece and the pixel. The processor is further configured to calculate a ratio of pixels. The system further includes a storage device configured to store the data. The storage device is further configured to store the path metric of the candidate piece of the contour, the value of the stored path metric being based on the calculated cost, the calculated orientation change value, and the calculated ratio.

In another aspect, there is a system. The system calculates an optimal candidate piece of a contour in a cross-sectional image to generate a three dimensional model using a plurality of cross-sectional images of an object. The system includes a storage device configured to receive data indicative of a first cross-sectional image and a second cross-sectional image adjacent to the first cross-sectional image, the first cross-sectional image and second cross-sectional image being in the plurality of cross-sectional images. The storage device is further configured to store data indicative of the optimal candidate piece of the contour. The system further includes a processor configured to, using the data, calculate a plurality of paths between a first point and a second point in the second cross-sectional image based on a lowest cost function. The processor is further configured to calculate a path metric for each path in the plurality of paths based on a path metric function, the path metric function being different from the lowest cost function. The processor is further configured to determine the an optimal candidate piece from the plurality of paths, the optimal candidate path having a highest path metric among the plurality of paths.

In another aspect, there is a computer program product. The computer program product is tangibly embodied in a computer readable medium. The computer program product is for calculating a path metric of a candidate piece of a contour in a cross-sectional image to generate a three dimensional model using a plurality of cross-sectional images of an object. The computer program product includes instructions being operable to cause a data processing apparatus to store data indicative of the cross-sectional image. The computer program product further includes instructions being operable to calculate a cost of each of a plurality of pixels associated with the candidate piece using the data, wherein the cost is representative of a likelihood the pixel is on the contour and the cost is based on one or more templates. The computer program product further includes instructions being operable to calculate an orientation change value for each of the plurality of pixels associated with the candidate piece based on an initial pixel of the candidate piece and the pixel. The computer program product includes instructions being operable to calculate a ratio of pixels. The computer program product includes instructions being operable to store the path metric of the candidate piece of the contour, the value of the stored path metric being based on the calculated cost, the calculated orientation change value, and the calculated ratio.

In another aspect, there is a computer program product. The computer program product is tangibly embodied in a computer readable medium. The computer program product is for calculating an optimal candidate piece of a contour in a cross-sectional image to generate a three dimensional model using a plurality of cross-sectional images of an object. The computer program product includes instructions being operable to cause a data processing apparatus to receive data indicative of a first cross-sectional image and a second cross-sectional image adjacent to the first cross-sectional image, the first cross-sectional image and second cross-sectional image being in the plurality of cross-sectional images. The computer program product further includes instructions being operable to, using the data, calculate a plurality of paths between a first point and a second point in the second cross-sectional image based on a lowest cost function. The computer program product further includes instructions being operable to calculate a path metric for each path in the plurality of paths based on a path metric function, the path metric function being different from the lowest cost function. The computer program product further includes instructions being operable to determine the optimal candidate piece from the plurality of paths, the optimal candidate path having a highest path metric among the plurality of paths. The computer program product further includes instructions being operable to store data indicative of the optimal candidate piece of the contour.

In another aspect, there is a system. The system calculates a path metric of a candidate piece of a contour in a cross-sectional image to generate a three dimensional model using a plurality of cross-sectional images of an object. The system includes means for storing data indicative of the cross-sectional image. The system includes means for calculating a cost of each of a plurality of pixels associated with the candidate piece using the data, wherein the cost is representative of a likelihood the pixel is on the contour and the cost is based on one or more templates. The system includes means for calculating an orientation change value for each of the plurality of pixels associated with the candidate piece based on an initial pixel of the candidate piece and the pixel. The system includes means for calculating a ratio of pixels. The system includes means for storing the path metric of the candidate piece of the contour, the value of the stored path metric being based on the calculated cost, the calculated orientation change value, and the calculated ratio.

In another aspect, there is a system. The system calculates an optimal candidate piece of a contour in a cross-sectional image to generate a three dimensional model using a plurality of cross-sectional images of an object. The system includes means for receiving data indicative of a first cross-sectional image and a second cross-sectional image adjacent to the first cross-sectional image, the first cross-sectional image and second cross-sectional image being in the plurality of cross-sectional images. The system includes means for, using the data, calculating a plurality of paths between a first point and a second point in the second cross-sectional image based on a lowest cost function. They system includes means for calculating a path metric for each path in the plurality of paths based on a path metric function, the path metric function being different from the lowest cost function. The system includes means for determining the optimal candidate piece from the plurality of paths, the optimal candidate path having a highest path metric among the plurality of paths. The system includes means for storing data indicative of the optimal candidate piece of the contour.

In other examples, any of the aspects above can include one or more of the following features. The path metric is calculated based on a summation of the calculated cost, the calculated orientation change value, the calculated ratio, or any combination thereof. Calculating the cost of each pixel includes, for each template of the one or more templates, calculating a template value by weighting the pixel and a plurality of neighboring pixels.

In some examples, the weight of each template pixel, the weight of the pixel, the weight of the plurality of neighboring pixels, or any combination thereof is minus one, zero, or one. The cost for the pixel is the highest template value associated with one of the one or more templates. Calculating the orientation change value is based on an angular change factor.

In other examples, determining the angular change factor includes determining an orientation change between the initial pixel and the pixel is less than ninety degrees and assigning the orientation change value one. Determining the angular change factor includes determining the orientation change between the initial pixel and the pixel is greater than or equal to ninety degrees but less than one hundred and thirty-five degrees and assigning the orientation change value of zero. Determining the angular change factor includes determining the orientation change between the initial pixel and the pixel is greater than or equal to one hundred and thirty-five degrees and assigning the orientation change value of negative one.

In some examples, a second ratio is calculated of one minus the first ratio over one plus the first ratio. It is determined whether each pixel of the plurality of pixels is an edge point based on an intensity value. Calculating a ratio of pixels includes calculating a ratio of pixels using a number of non-edge pixels over a total number of the plurality of pixels. The data is indicative of a plurality of edge points for the first cross-sectional image.

In other examples, the first point of the second cross-sectional image is calculated based on a first edge point for the first cross-sectional image from the plurality of edge points for the first cross-sectional image. The second point of the second cross-sectional image is determined based on a second edge point from the plurality of edge points for the first cross-sectional image. Each path in the plurality of paths extends from the first point to a third point, the third point being based on the first point and the second point.

In some examples, the first point is based on a line from a centroid of a second contour on the second cross-sectional image. The first point corresponds to a point with a maximal edge cost. The path metric for each path is based on an edge cost function, an orientation change, and a number of pixels of the respective path not on the contour. The edge cost function is based on a weighting for each pixel of a plurality of pixels for each respective path for each template of one or more templates. The orientation change is based on an angular change factor.

The automatic image segmentation using contour propagation techniques described herein can provide one or more of the following advantages. An advantage of the techniques is the accurate and fast construction of a 3D surface of an object by providing a technique for automatic image segmentation with reduced algorithm complexity and less manual intervention. Manually selected edge points of a contour of a first slice can be propagated to adjacent slices and automatically used to determine the contours of the adjacent slices. Additionally, the disclosed systems and methods overcome the boundary snapping problem.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 6C shows an expanded view of the second cross-sectional image with multiple candidate optimal paths for automatic image segmentation using contour propagation.

DETAILED DESCRIPTION

In general overview, techniques are described for automatically calculating a contour in a cross-sectional image after a set of edge points has been manually inserted into an adjacent cross-sectional image. As described in more detail below, this is done by using the manually inserted edge points as seed points for the adjacent cross-sectional image, automatically determining a plurality of paths to the seed points and other possible neighboring points using a cost function, and applying a path metric that is different from the cost function to assess each of the paths and select the optimal one based on the path metric. In these techniques, a user only needs to enter control points for a first contour of a first cross-sectional image, and the contour is automatically propagated to adjacent contours. One factor used in the path metric is the orientation changes along the path. Another factor used in the path metric is the distribution of the edge points. If the edge cost at a point is less than the pre-set threshold, the point is considered as a non-edge point. A weighting factor is based on the percentage of the non-edge points.

Figure 1:
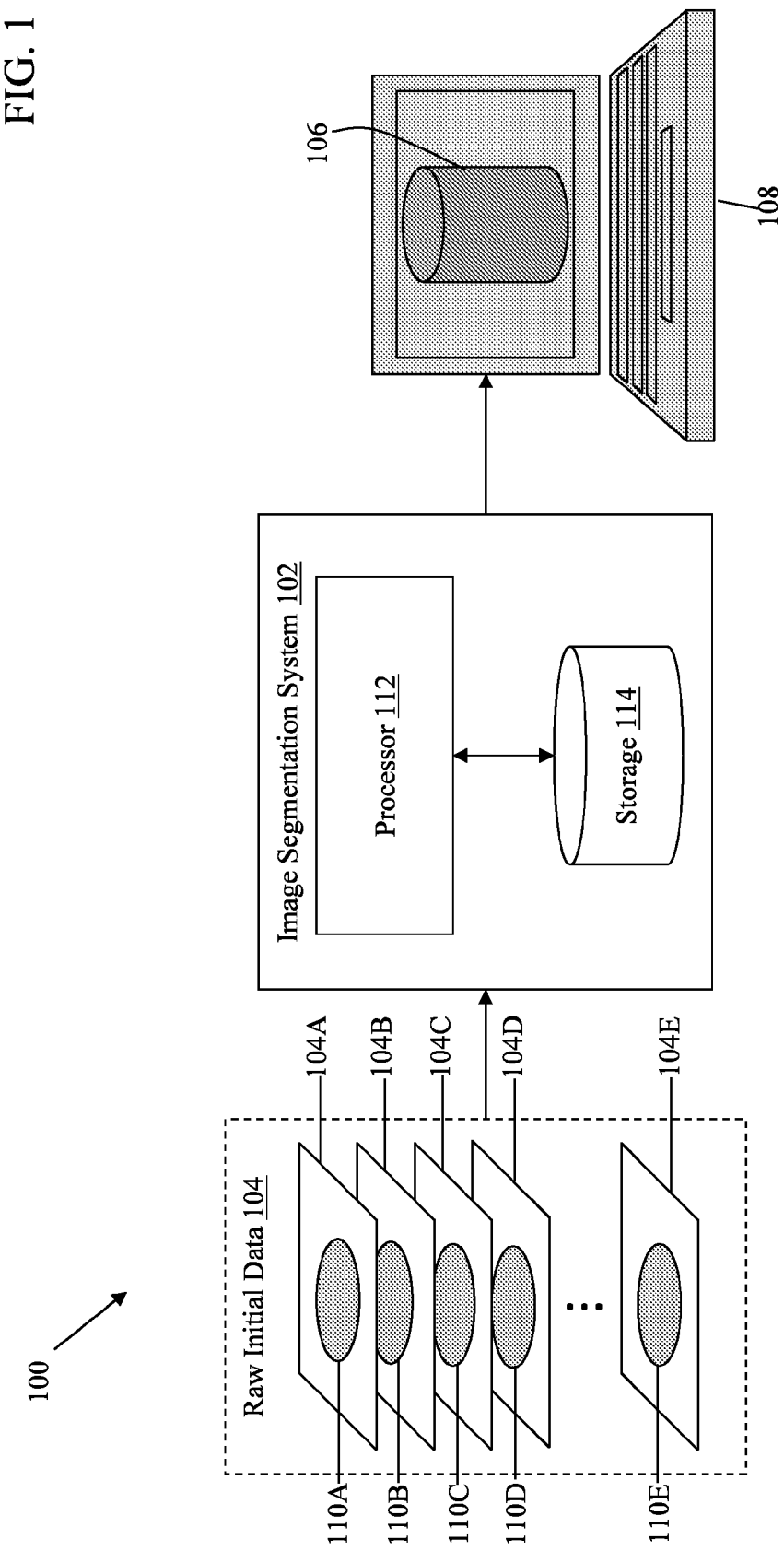
FIG. 1 shows an automatic image segmentation system using contour propagation.

FIG. 1 shows an automatic image segmentation system 100 using contour propagation. The image segmentation system 102 receives raw initial data 104. The image segmentation system 102 displays a 3D model 106 based on the raw initial data 104. The 3D model is displayed on a display 108. The raw initial data 104 contains data indicative of a plurality of parallel slices (e.g., slice one 104A through slice N 104E, where N is any positive integer) of images of a 3D object. Each slice (e.g., slice one 104A) includes at least one contour (e.g., contour 110A) of the 3D object. The image segmentation system 102 includes a processor 112. The processor 112 is in communication with a storage medium 114. The display 108 can be any type of visual display device, such as a laptop screen, a personal computer monitor, or a television screen. Although illustrated separately, the image segmentation system 102 and the display 108 can be part of the same physical device as well as being distributed among several physical devices.

In some examples, the raw initial data is generated by a CT scan of a patient's anatomy, such as a knee which includes a femur and a tibia. A set of parallel slices of images (e.g., slice one 104A through slice N 104E) is generated for the knee portion of interest. The object of interest (e.g., the femur or tibia) is segmented in a slice-by-slice fashion. An exemplary segmentation of a femur and tibia is explained below with reference to FIGS. 12A-12D and 13A-13C. The format of the CT scan file can be an image guided surgery (IGS) format. The IGS format can be converted from a Digital Imaging and Communications in Medicine (DICOM) format. In some examples, the set of parallel slices of images can be obtained by an MRI scan.

Figure 2:
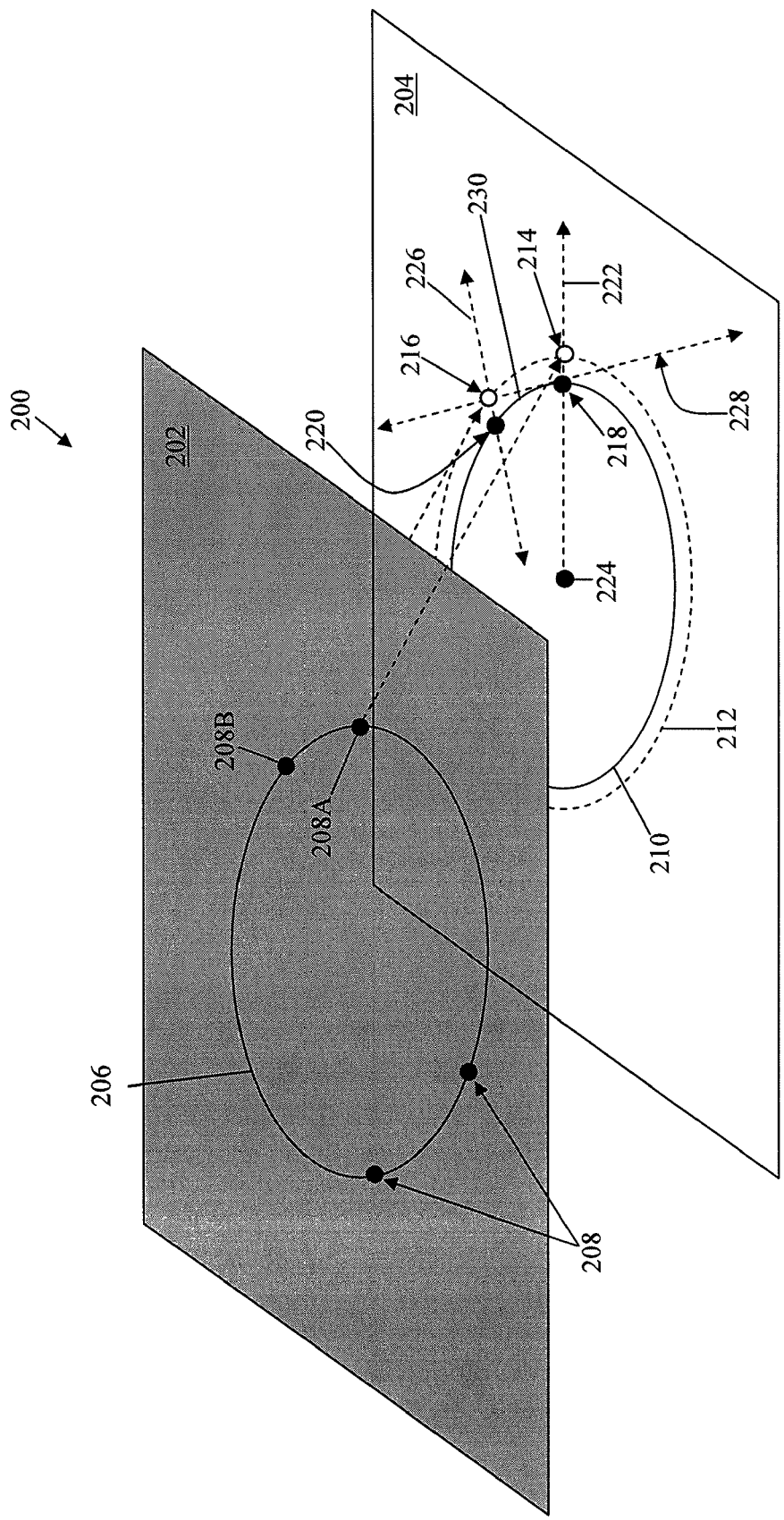
FIG. 2 shows an exemplary depiction of automatic image segmentation system using contour propagation.

FIG. 2 shows an exemplary illustration 200 of automatic image segmentation using contour propagation. The illustration 200 includes a first cross-sectional image 202 and an adjacent second cross-sectional image 204. The terms "slice" and "cross-sectional image" are used interchangeably herein. The first cross-sectional image 202 includes a first contour 206. The first cross-sectional image 202 has control points 208 around the first contour 206. The control points 208 are edge points that may have been manually inserted or automatically determined using the techniques described herein. The control points 208 include an initial control point 208A and a second control point 208B. The second cross-sectional image 204 includes a second contour 210.

The superimposed first contour 212 is an outline of where the first contour 206 is in relation to the second contour 210 when the first cross-sectional image 202 and second cross-sectional image 204 are aligned vertically. The superimposed first contour 212 does not actually appear on the second cross-sectional image 204 and is placed there for illustrative purposes only (and this is true for other superimposed images as well, e.g., FIGS. 5A, 5B, 6A, 6B, 6C, 10A). While spherical shapes are used herein to represent the contours, spherical shapes are used for illustrative purposes only. The three dimensional shapes that are modeled are often not of a uniform size or shape. While the superimposed first contour 212 is evenly distributed around the second contour 210, this is for illustrative purposes only (and this is true for other superimposed images as well, e.g., FIGS. 5A, 5B, 6A, 6B, 6C, 10A). When two cross-sectional images are aligned and superimposed, the first contour can be larger than the second contour, smaller than the second contour, overlapping the second contour, and/or the like.

The second cross-sectional image 204 includes an initial seed point 214 and a second seed point 216. The second cross-sectional image 204 includes an accurate initial edge point 218 and a second edge point 220. The first line 222 extends from the centroid 224 of the second contour 210. The second line 226 extends perpendicularly to line 228. Line 228 passes through the second seed point 216 and the initial edge point 218. An optimal path 230 extends from the initial edge point 218 and the second edge point 220. This optimal path 230 represents the most likely contour path between the two edge points. Advantageously, because image segmentation is performed in a slice-by-slice fashion, the contour boundaries on parallel neighboring slices (e.g., contour 206 of cross-sectional image 202 and contour 210 of cross-sectional image 204) usually have a high correlation.

Figure 3:
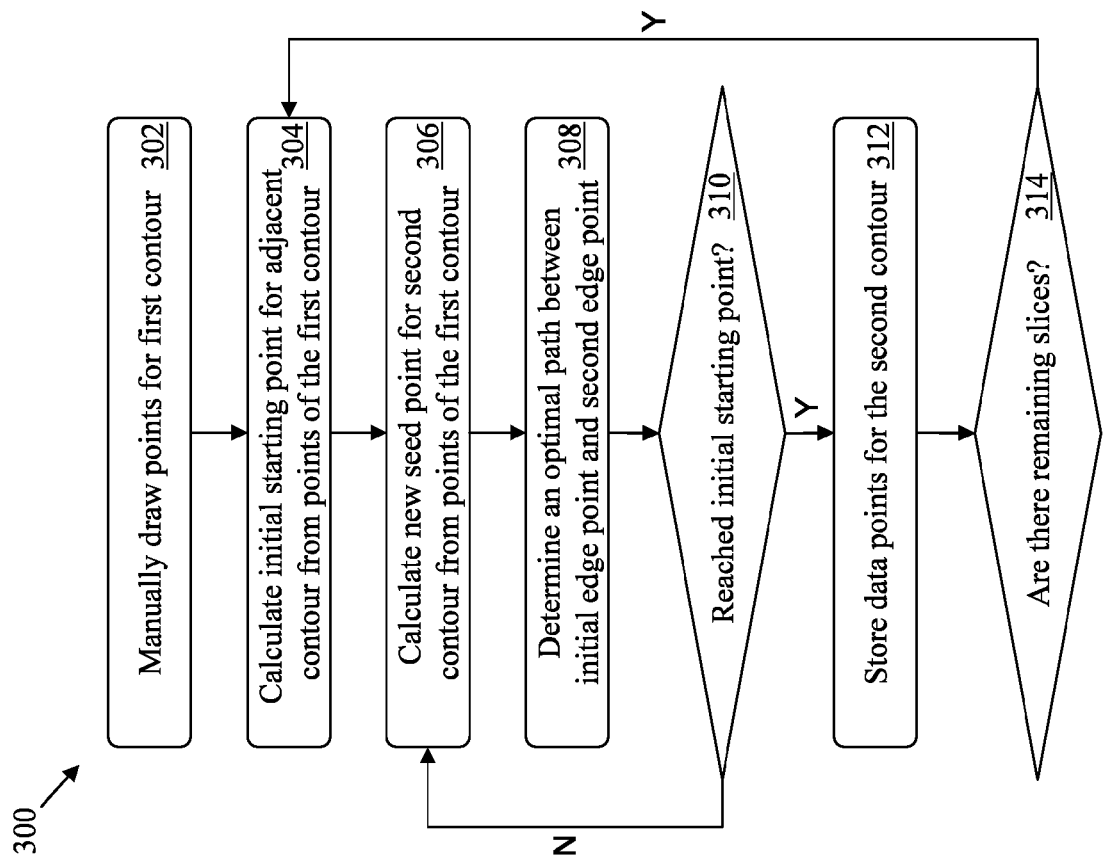
FIG. 3 shows a flow diagram of automatic image segmentation system using contour propagation.

FIG. 3 shows a flow diagram 300 of automatic image segmentation using contour propagation with reference to FIG. 2. A user manually inserts (302) control points 208 for the first contour 206 of the first cross-sectional image 202. The user can use a manual segmentation program to segment the first contour 206. For example, the user draws the control points 208 with a manual segmentation program using the Live Wire paradigm to manually segment the first slice. In some embodiments, the user places the initial control point 208A near the contour line of the object (e.g., the initial control point 208A of the first contour 206) to begin the segmentation process. The user adds the second control point 208B. The system draws a boundary line from the first control point 208A to the second control point 208B which extends along the edge of the first contour 206. The process can be repeated by adding all control points 208 until reaching the initial control point 208.

In some examples, the manual segmentation program uses a cost function to delineate the object boundary (i.e., the first contour 206) using the control points inserted by the user. Equation 1 is an exemplary function that can be used to compute the cost of a pixel to determine whether the pixel is located on an edge of the object:

$$C(x,y) = Wd \cdot Fd(x,y) + Wz \cdot Fz(x,y) \quad \text{Equation 1}$$

where:
$C(x,y)$ is the cost function to evaluate if the pixel located at $(x,y)$ is on an edge;
Wd and Wz are weighting factors calculated in conjunction with Equation 4 below;
$Fd(x,y)$ is the Gradient magnitude component function at point $(x,y)$, computed with Equation 2; and
$Fz(x,y)$ is the Laplacian of Gaussian Zero Crossing function at $(x,y)$, computed with Equation 3.

$$Fd(x,y) = \sqrt{I_x^2 + I_y^2} \quad \text{Equation 2}$$

where Ix and Iy are gradients defined as:
Ix=I(x,y)−I(x−1,y);
Iy=I(x,y)−I(x,y−1); and
I(x,y) is the gray intensity at pixel (x,y) on the image.

$$Fz(x, y) = \begin{cases} 0 & \text{if } I_L(x, y) = 0 \\ 1 & \text{if } I_L(x, y) \neq 0 \end{cases} \quad \text{Equation 3}$$

where $Fz(x,y)$ is calculated using a template to determine the value of each pixel at $(x,y)$.

The higher the value of $C(x,y)$, the higher the possibility that pixel $(x,y)$ is on an edge. $Fz(x,y)$ can be calculated using any size template (e.g., 9×9 template, 4×4 template, etc.). For example, a 4×4 template would use Equation 4:

$$\text{Lap}(x,y) = 4 \cdot I(x,y) - I(x-1,y) - I(x+1,y) - I(x,y-1) - I(x,y+1) \quad \text{Equation 4}$$

where I(x,y) is the gray intensity at pixel (x,y) on the image.

Lap(x,y) is calculated row by row, then column by column. If Lap(x,y) changes from a positive value to negative value or from a negative value to a positive value, Fz(x,y) is set to 1, otherwise Fz(x,y) is set to 0. Referencing Equation 3, $I_L(x,y)$ is a function to detect the change of Lap(x,y). If Lap(x,y) changes the sign of the value, $I_L(x,y)=1$; otherwise $I_L(x,y)=0$. The path around the first contour 206 is calculated by maximizing the cost of the edge along the path. For example, for the second control point 208B, the optimal path to the first control point 208A has a highest cost out of a cost associated with a plurality of computed paths.

Referring back to process 300, contour propagation from the first contour 206 to the second contour 210 continues by calculating (304) the accurate initial edge point 218 from the control points 208. The initial edge point is based on the initial seed point 214 and line 222. The second edge point 220 is calculated (306) based on the second seed point 216 and line 226. The system (e.g., the image segmentation system 102 of FIG. 1) calculates (308) the optimal path 230 (calculating the optimal path 230 and steps 304 and 306 are explained further with reference to FIGS. 4-11B). In some embodiments, the optimal path 230 has the highest cost $C(x,y)$ and a highest path metric. The system determines (310) whether the system reached the initial seed point 214. If the initial seed point 214 has not been reached, the system proceeds to step (306) to calculate a new seed point. The system proceeds until the initial seed point 214 is reached, at which time the optimal path for the second contour 210 is completed. The data points for the second contour are stored (312) (e.g., in the data storage 114 of FIG. 1). The system determines (314) whether there are additional cross-sectional images to propagate. If there are additional cross-sectional images, the system proceeds to step (304) using the newly stored (312) data points for the second contour in relation to the new cross-sectional image.

Figure 4:
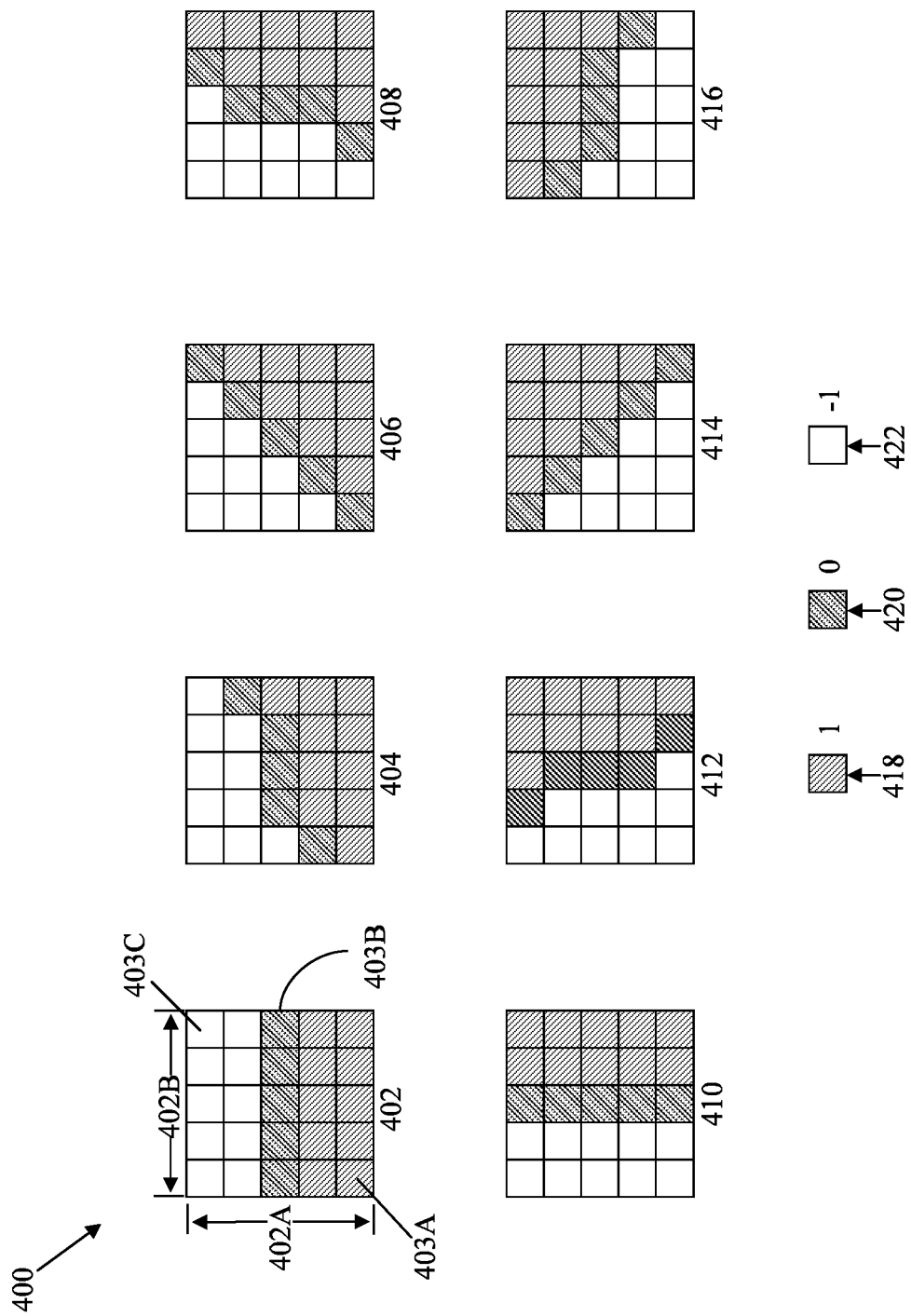
FIG. 4 shows exemplary group of templates for automatic image segmentation system using contour propagation.

FIG. 4 shows an exemplary group 400 of templates for automatic image segmentation system using contour propagation. Each template (e.g., template 402 through template 416) has the same height and width (e.g., template 402 has height 402A of five pixels and width 402B of five pixels). Each template pixel has an associated weight. For example, pixel 403A of template 402 has weight 418 of 1, pixel 403B has weight 420 of 0, and pixel 403C has weight 422 of weight −1. Any number of templates can be used (e.g., group 400 could include sixteen templates instead of eight), and the templates can vary in pixel size (e.g., 8×8, 10×10, etc.). The templates can provide higher weighting for pixel groupings which are located on the edge of a contour, and lower weightings for pixel groupings which are not located on the edge of a contour. The application of the group 400 of templates is described further in conjunction with FIGS. 5A through 5C.

Figure 5A:
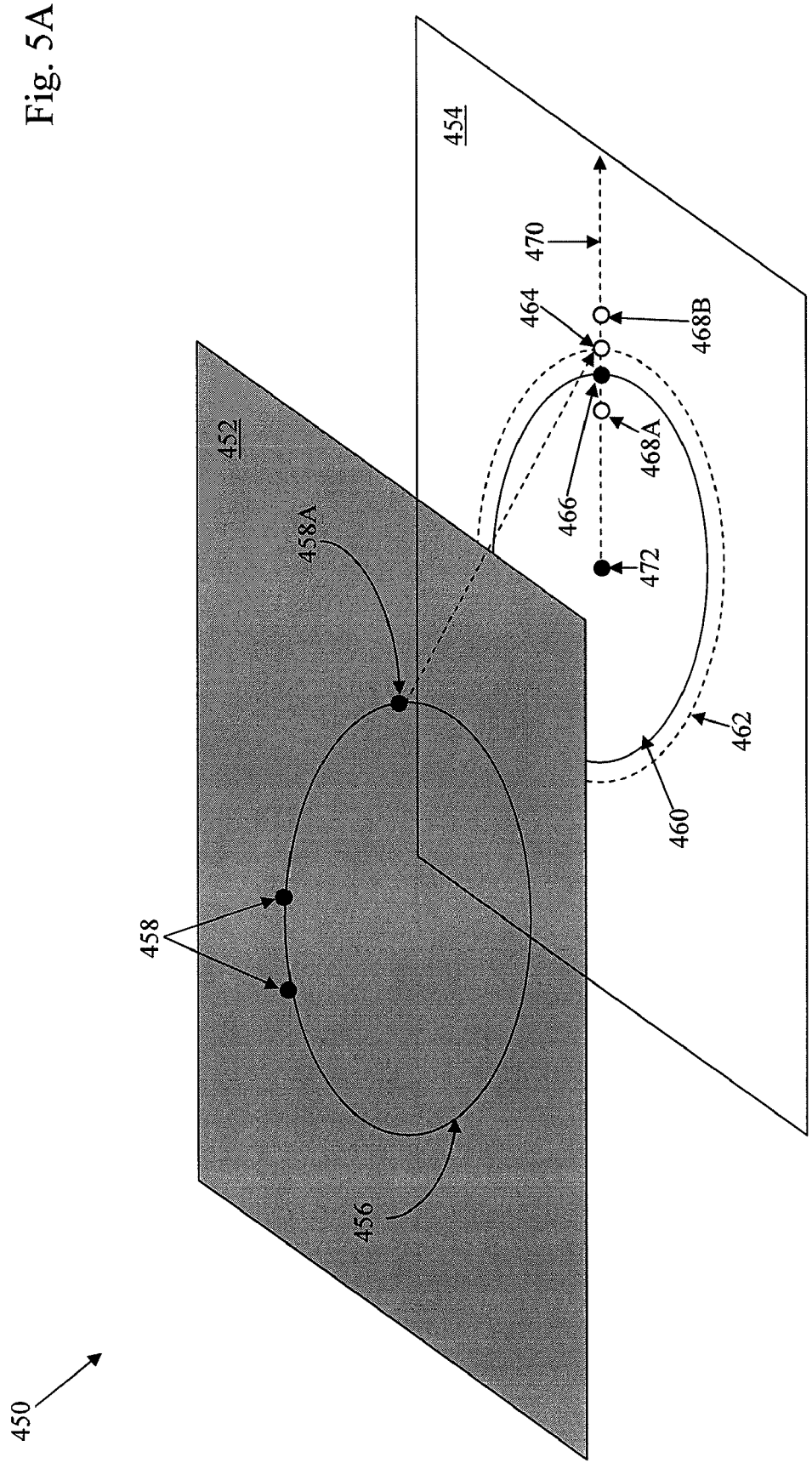
FIG. 5A shows an exemplary depiction of the initial edge point calculation for automatic image segmentation using contour propagation.

FIG. 5A shows an exemplary depiction 450 of the initial edge point calculation for automatic image segmentation using contour propagation. The depiction 450 includes a first cross-sectional image 452 and an adjacent second cross-sectional image 454. The first cross-sectional image 452 includes a first contour 456. The first cross-sectional image 452 has control points 458 around the first contour 456. The control points 458 include an initial control point 458A. The second cross-sectional image 454 includes a second contour 460. The superimposed first contour 462 is an outline of where the first contour 456 is in relation to the second contour 460 when the first cross-sectional image 452 and second cross-sectional image 454 are aligned vertically. The second cross-sectional image 454 includes an initial seed point 464, an initial edge point 466, and candidate initial edge points 468A and 468B. The horizontal line 470 extends from the centroid 472 of the second contour 460 through the initial seed point 464.

Figure 5B:
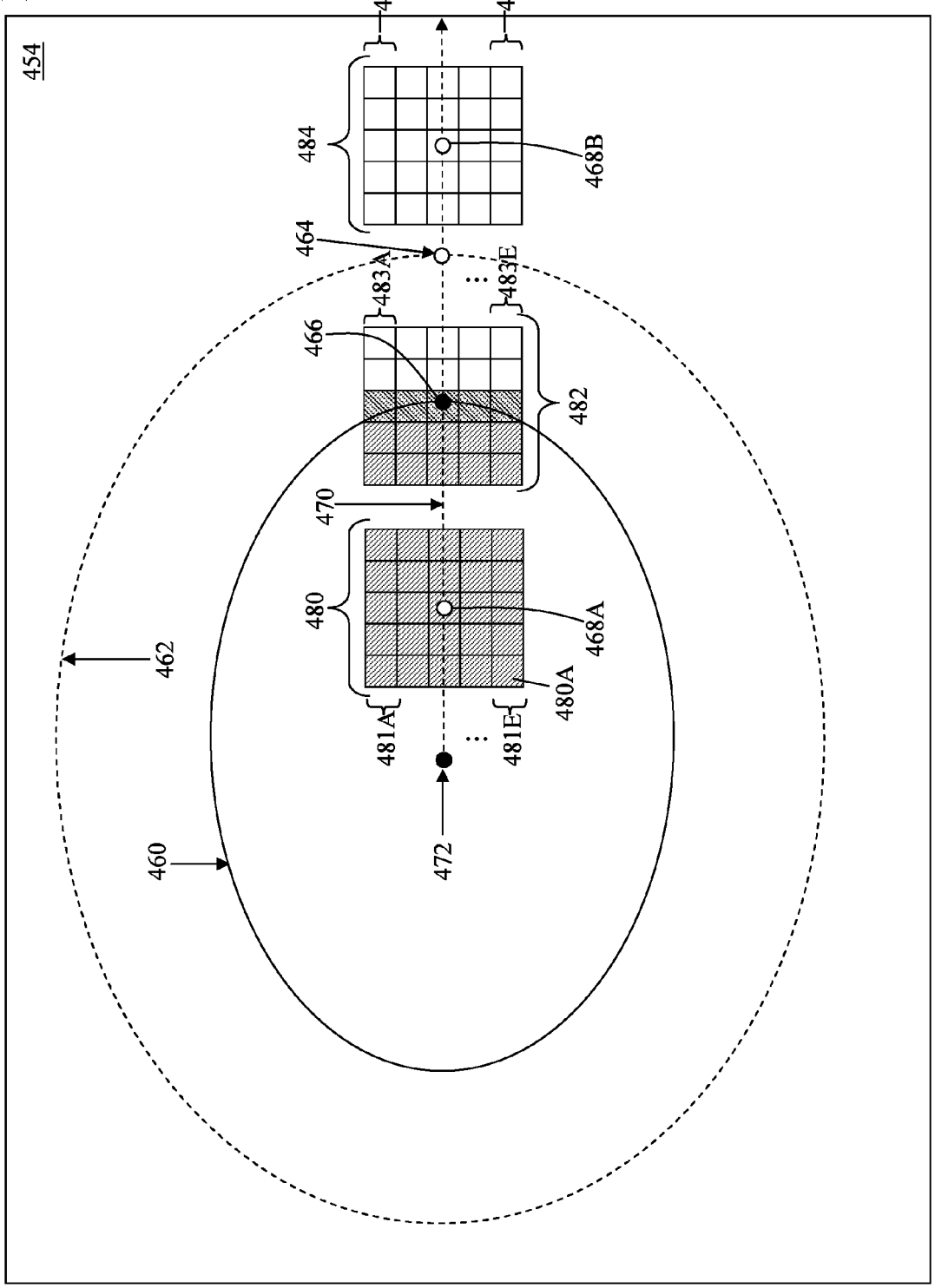
FIG. 5B shows an expanded view of the second cross-sectional image for automatic image segmentation using contour propagation.

FIG. 5B shows an expanded view of the second cross-sectional image 454 for automatic image segmentation using contour propagation. The cross-sectional image 454 includes the second contour 460 and the superimposed first contour 462. The line 470 extends from the centroid 472 of the contour 460 through the initial seed point 464. The initial seed point is based on control point 458A. For example, when the first contour 456 is superimposed on the second cross-sectional image 454, the control point 458A is located at initial seed point 464. Pixel grouping 480, which includes pixel 480A, is the surrounding group of twenty-five pixels for candidate initial edge point 468A. Pixel grouping 480 includes row 481A through row 481E. Pixel grouping 482 is the surrounding group of twenty-five pixels for initial edge point 466 (which is also a candidate edge point until the templates are used to determine it has the maximal edge cost). Pixel grouping 482 includes row 483A through row 483E. Pixel grouping 484 is the surrounding group of twenty-five pixels for candidate initial edge point 468B. Pixel grouping 484 includes row 485A through row 485E.

With reference to FIGS. 4 and 5A-5B, the system uses the group 400 of templates to determine an accurate initial edge point (i.e., initial edge point 466). The search process for an initial point starts from the centroid of the contour on the neighboring slice (e.g., the second cross-sectional image 454, which is neighboring the first cross-sectional image 452). The system searches candidate initial edge points (e.g., points 466, 468A and 468B) along the horizontal line 470. The system can search any number of points along the horizontal line 470. The initial point corresponds to the point with maximal edge cost of the points searched along the horizontal line 470. The templates (e.g., templates 402 through template 416) are used to calculate the edge cost of each initial edge point. For each template, each pixel's weight (e.g., weight 418 1 for pixel 403A of template 402) is multiplied by the corresponding pixel from the surrounding group of pixels of the initial edge point the system is analyzing.

For example, when the system uses template 402 to evaluate candidate initial edge point 468A, pixel 403A with weight 418 of 1 is multiplied by weight 418 of 1 for pixel 480A, which equals one. The multiplication is carried out for each pixel of template 402 and the corresponding pixel in pixel grouping 480. All the multiplication values (e.g., all twenty-five multiplication steps for template 402) are added together to calculate the final edge cost as the absolute value of the summation of all the multiplications. As an illustrative example, template 402 can be applied to pixel grouping 480. With reference to the hatching in FIG. 4, the pixels inside the contour 460 of FIG. 5B (i.e., all the pixels of pixel grouping 480 and the first two columns of pixels for pixel grouping 482) have a weight 418 of 1. The pixels on the edge of the contour 460 (i.e., the middle column of pixel grouping 482) have a weight of 420 0. The pixels outside the contour 460 (i.e., the last two columns of pixel grouping 482 and all the pixels of pixel grouping 484) have a weight 422 of −1. All pixels of pixel grouping 480 have a value of weight 418 1. Ten pixels of template 402 (e.g., pixel 403C) have weight 422 of −1. Ten pixels have weight 418 1 (e.g., pixel 403A). Five pixels (e.g., pixel 403B) have weight 420 0. The final edge cost of pixel 468A=10×(1×1)+10×(−1×1)+5×(1×0)=10−10+0=0.

In some examples, if candidate initial edge point 468A is at coordinate (x, y), and (0, 0) is on the up-left corner of the image, 468A=$I(x-2, y+2) \times 1 + I(x-1, y+2) \times 1 + I(x, y+2) \times 1 + I(x+1, y+2) \times 1 + I(x+2, y+2) \times 1 + I(x-2, y+1) \times 1 + I(x-1, y+1) \times 1 + I(x, y+1) \times 1 + I(x+1, y+1) \times 1 + I(x+2, y+1) \times 1 + I(x-2, y) \times 0 + I(x-1, y) \times 0 + I(x, y) \times 0 + I(x+1, y) \times 0 + I(x+2, y) \times 0 + I(x-2, y-1) \times (-1) + I(x-1, y-1) \times (-1) + I(x, y-1) \times (-1) + I(x+1, y-1) \times (-1) + I(x+2, y-1) \times (-1) + I(x-2, y-2) \times (-1) + I(x-1, y-2) \times (-1) + I(x, y-2) \times (-1) + I(x+1, y-2) \times (-1) + I(x+2, y-2) \times (-1))$.

For example, template 408 can be applied to pixel grouping 482. The row 483A pixel weight=(1×−1)+(1×−1)+(0×−1)+(−1×0)+(−1×1)=−1+−1+0+0+−1=−3, where the left number of each multiplication is the pixel weight of template 408 proceeding from left to right, and the right number of each multiplication is the corresponding pixel weight of pixel group 482. Row 483B pixel multiplication value=(1×−1)+

$(1\times-1)+(0\times0)+(31\quad 1\times1)+(-1\times1)=-1+-1+0+-1+-1=-4$. Row 483C pixel multiplication value=$(1\times-1)+(1\times-1)+(0\times0)+(-1\times1)+(-1\times1)=-1+-1+0+-1+-1=-4$. Row 483D pixel multiplication value=$(1\times-1)+(1\times-1)+(0\times0)+(-1\times1)+(-1\times1)=-1+-1+0+-1+-1=-4$. Row 483E pixel=$(1\times-1)+(1\times0)+(0\times1)+(-1\times1)+(-1\times1)=-1+0+0+-1+-1=-3$. The total weight for template 408 is the absolute sum of the multiplication values for each row=$|-3+-4+-4+-4+-3|=18$. The optimal template for pixel group 482 would be 410. Because each row is the same, the weight of the optimal template would equal $|5\times[(-1\times1)+(-1\times1)+(0\times0)+(1\times-1)+(1\times-1)]|=|5\times[-1+-1+0+-1+-1]|=|5\times-4|=20$. The system calculates each template value for each candidate pixel (e.g., a value for each template from group 400 for pixel 466). The system assigns the highest template value from the group of templates to each pixel. The system selects the pixel with the highest template value as the initial point (i.e., pixel 466).

Figure 5C:
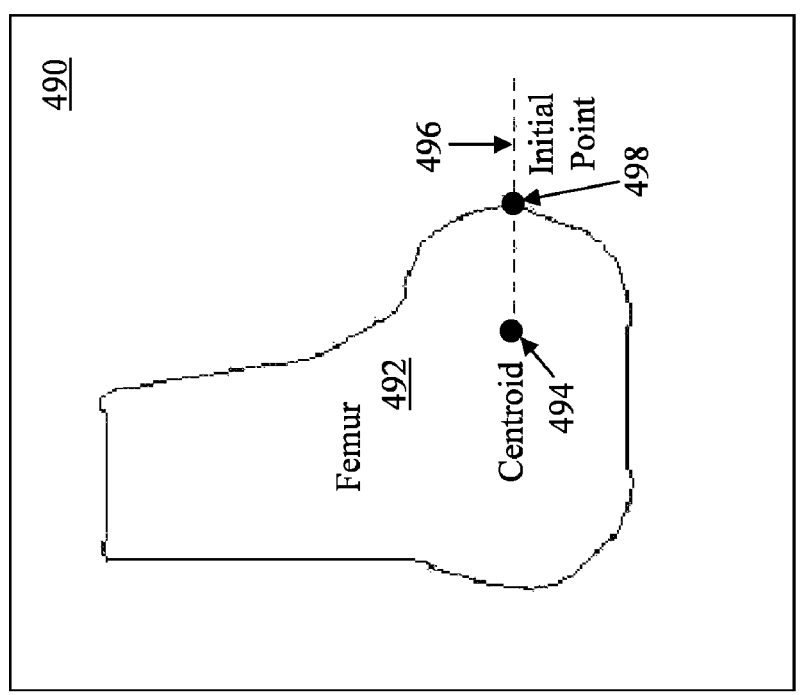
FIG. 5C shows an exemplary cross-sectional image of a femur bone for automatic image segmentation using contour propagation.

FIG. 5C shows an exemplary cross-sectional image 490 of a femur bone 492 for automatic image segmentation using contour propagation. The system calculates the centroid 494 of the femur 492. The system calculates the edge cost of multiple different potential initial edge points (e.g., 40 different potential initial edge points) along the horizontal line 496. The initial point 498 is the point among the different potential initial edge points with the highest edge cost. In some embodiments, any standard edge detection algorithm (e.g., such as the Sobel operator) can be employed to determine the initial edge point 466.

Figure 6A:
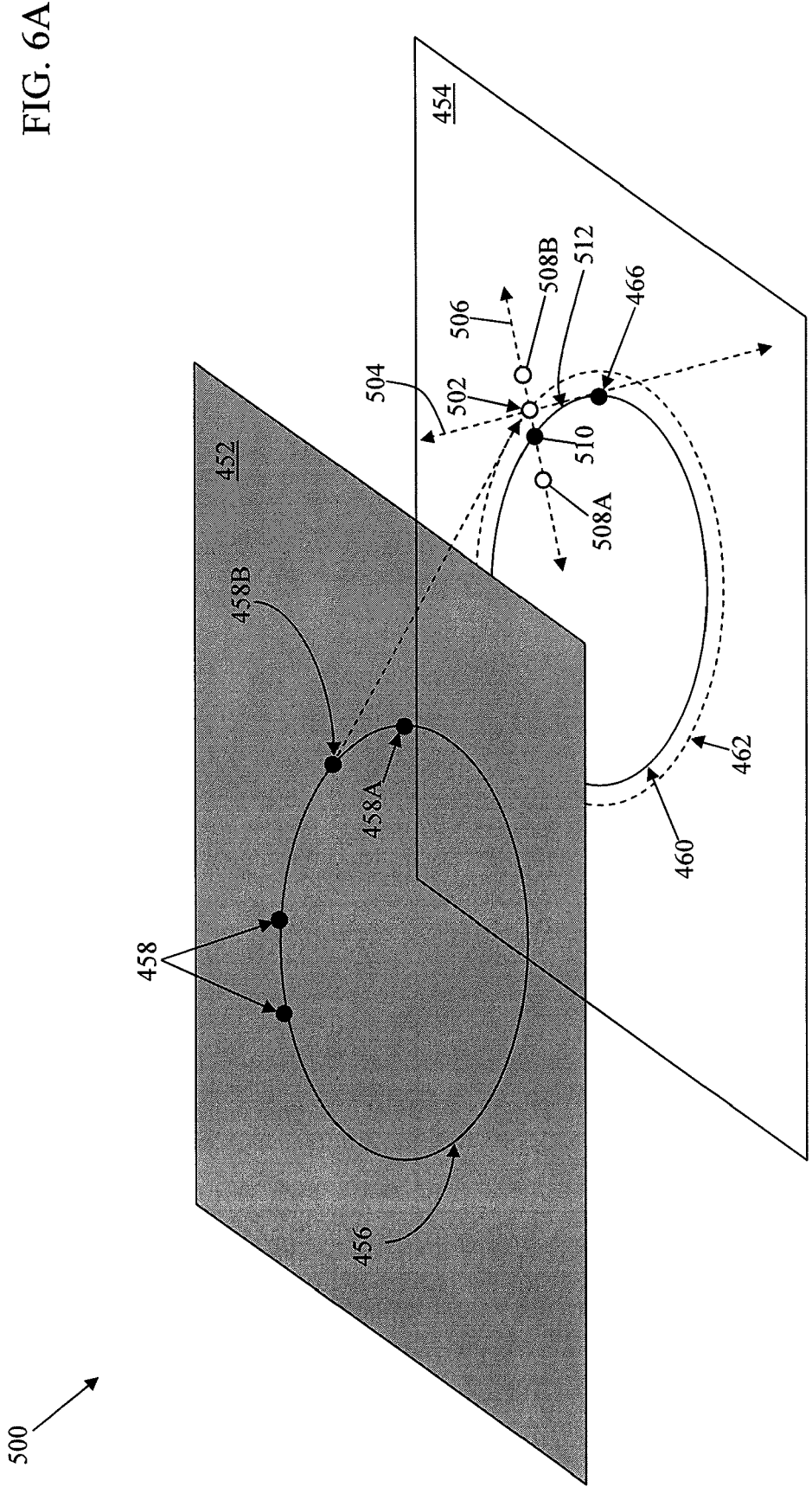
FIG. 6A shows an exemplary depiction of the second edge point calculation for automatic image segmentation using contour propagation.
Figure 6B:
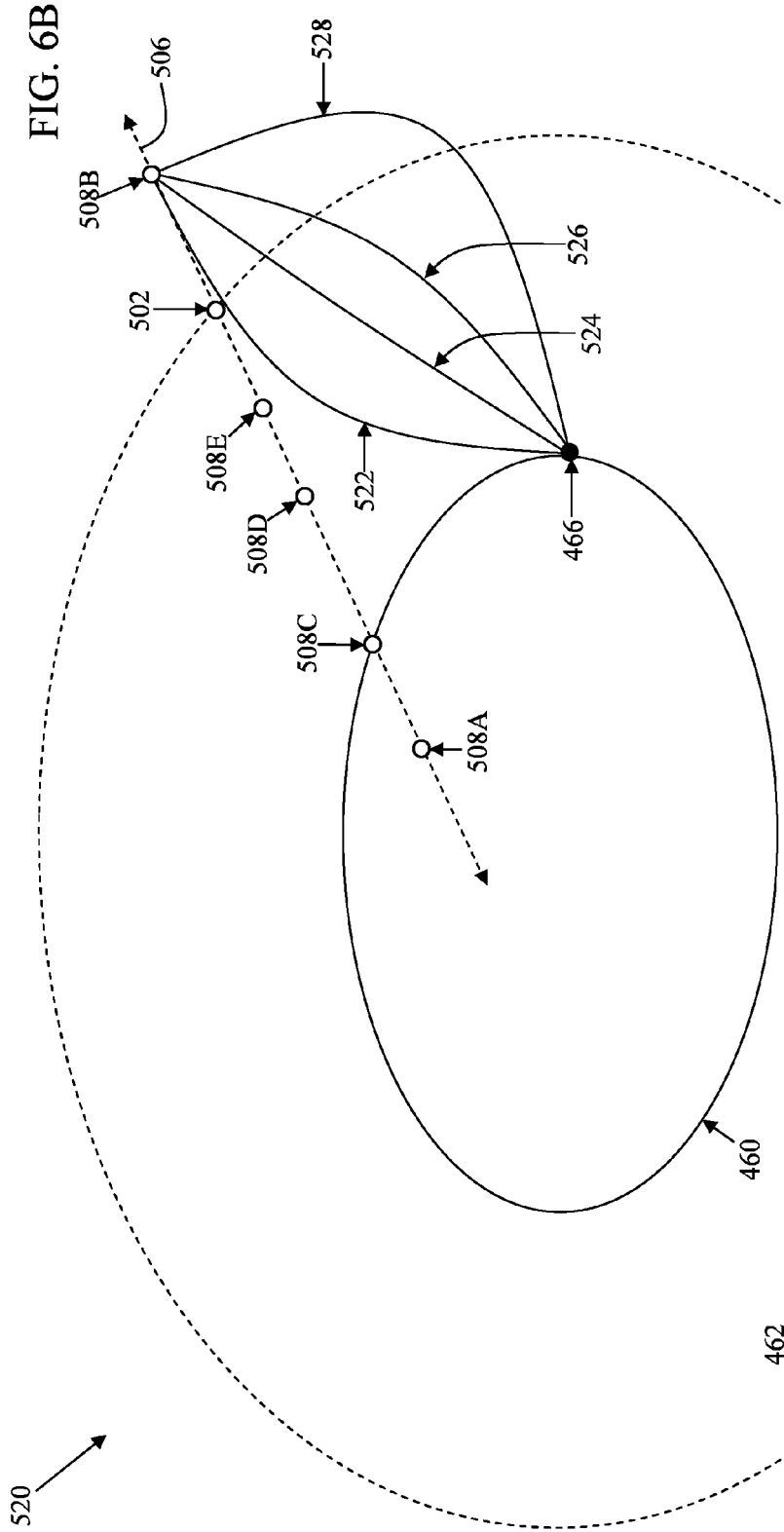
FIG. 6B shows an expanded view of the second cross-sectional image with multiple paths to a candidate second edge point for automatic image segmentation using contour propagation.
Figure 7:
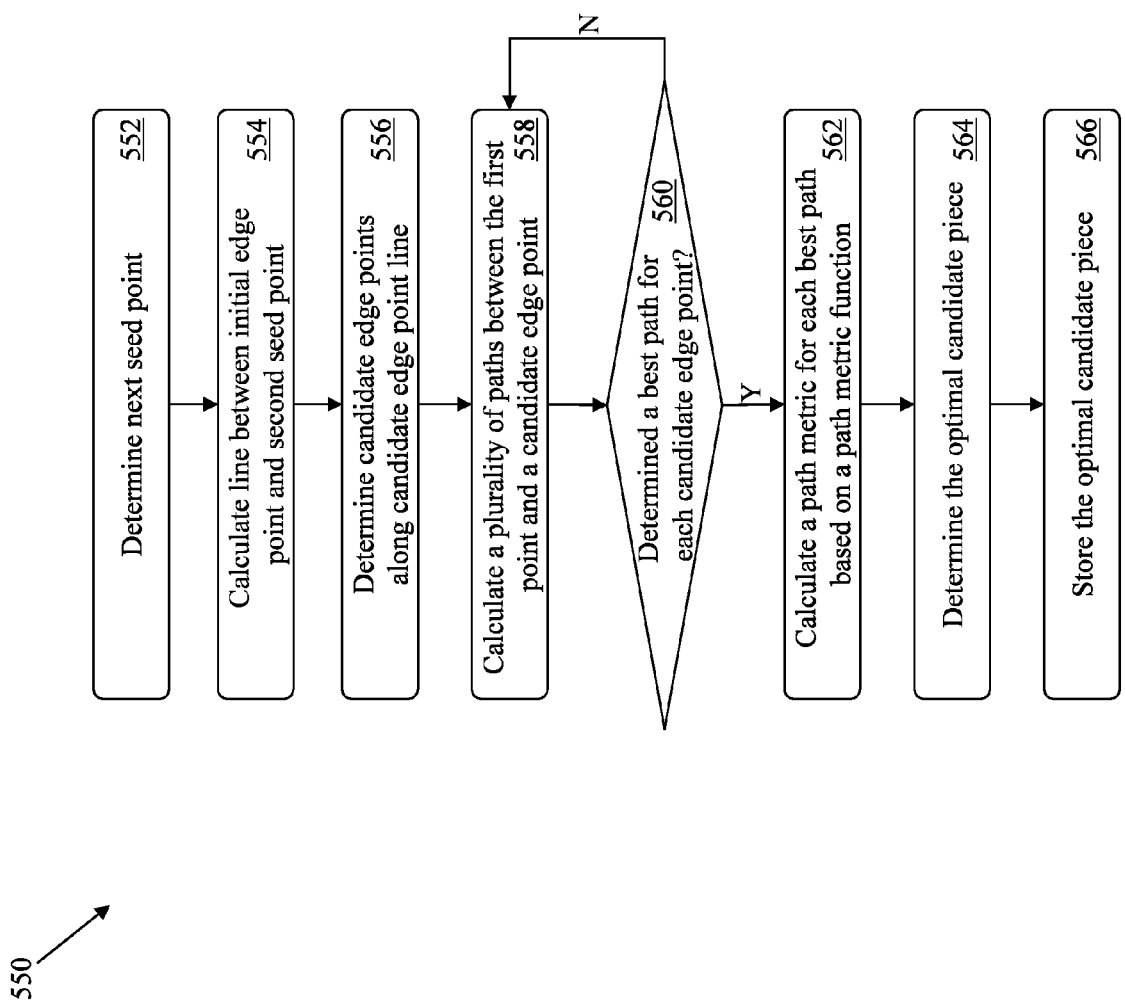
FIG. 7 shows a flow diagram of calculating an optimal candidate path for automatic image segmentation using contour propagation.

FIGS. 6A-6C are explained in conjunction with FIG. 7. FIG. 6A shows an exemplary depiction 500 of the second edge point calculation for automatic image segmentation using contour propagation. With reference to FIG. 6A, the depiction 500 includes the first cross-sectional image 452 and the adjacent second cross-sectional image 454. The first cross-sectional image 452 includes the first contour 456. The first cross-sectional image 452 has control points 458 around the first contour 456. The control points 458 include an initial control point 458A and a second control point 458B. The second cross-sectional image 454 includes a second contour 460. The superimposed first contour 462 is an outline of where the first contour 456 is in relation to the second contour 460 when the first cross-sectional image 452 and second cross-sectional image 454 are aligned vertically.

The second cross-sectional image 454 includes the initial edge point 466 (e.g., as calculated based on FIGS. 4-5C). The second cross-sectional image 454 includes a second seed point 502 (i.e., the location of the second control point 458B along the superimposed first contour 462). Line 504 passes through the initial edge point 466 and the second seed point 502. Line 506 passes through the second seed point 502 and is perpendicular to line 504. Candidate second edge points 508A and 508B are located along line 506. Second edge point 510 (which is also a candidate edge point before determining it is the second edge point) is located along the second contour 460. The optimal path 512 is along the second contour between the initial edge point 466 and the second edge point 510.

FIG. 6B shows an expanded view 520 of the second cross-sectional image 454 with multiple paths to candidate second edge point 508B for automatic image segmentation using contour propagation. The expanded view 520 includes the second contour 460 and the superimposed first contour 462. The expanded view 520 includes the initial edge point 466 and line 506 passing through the second seed point 502. Candidate second edge points 508A, 508B, 508C, 508D, and 508E are along line 506. Paths 522, 524, 526, and 528 extend from initial edge point 466 to candidate second edge point 508B.

FIG. 6C shows an expanded view 530 of the second cross-sectional image 454 with multiple candidate optimal paths for automatic image segmentation using contour propagation. The expanded view 530 includes the second contour 460 and the superimposed first contour 462. The expanded view 530 includes the initial edge point 466 and line 506 passing through the second seed point 502. Candidate second edge points 508A, 508B, 508C, 508D, and 508E are along line 506. A candidate optimal path extends from the initial edge point 466 to each of the candidate second edge points. Path 532 extends from the initial edge point 466 to candidate second edge point 508A. Path 534 extends from the initial edge point 466 to candidate second edge point 508C. Path 536 extends from the initial edge point 466 to candidate second edge point 508D. Path 538 extends from the initial edge point 466 to candidate second edge point 508E. Path 540 extends from the initial edge point 466 to the second seed point 502 (which can also be a candidate second edge point). Path 526 extends from the initial edge point 466 to candidate second edge point 508B.

Figure 6D:
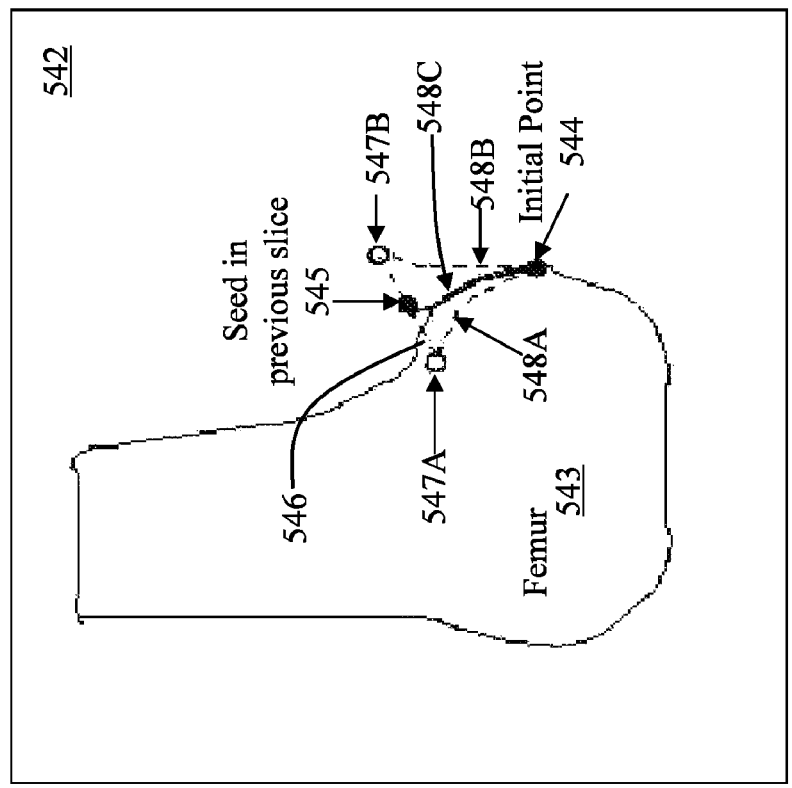
FIG. 6D shows an exemplary second edge point calculation for a cross-sectional image of a femur bone for automatic image segmentation using contour propagation.

FIG. 6D shows an exemplary second edge point calculation for a cross-sectional image 542 of a femur bone 543 for automatic image segmentation using contour propagation. The system uses initial edge point 544 to determine the orientation of line 546. Line 546 extends through the seed point in the previous slice 545. The system determines candidate edge points 547A to 547B. The system calculates candidate paths 548A, 548B, and 548C based on a plurality of paths. The optimal path of paths 548A through 548C is determined based on a path metric.

FIG. 7 shows a flow diagram 550 of calculating an optimal candidate path for automatic image segmentation using contour propagation. Referencing FIGS. 6A-6C, the system (e.g., the image segmentation system 102 of FIG. 1) determines (552) the second seed point 502. The second seed point 502 is based on the location of the second control point 458B when the first contour 456 is superimposed over the second contour 460. The system calculates (554) line 504, line 504 intersecting the initial edge point 466 and the second seed point 502. The system determines (556) candidate edge points (e.g., candidate second edge points 508A and 508B) along line 506. Line 506 is determined through the second seed point 502 based on line 504. Line 506 can be perpendicular to line 504.

The system calculates (558) a plurality of paths between a candidate edge point and the initial edge point 466. For example, the system calculates paths 522, 524, 526, and 528 between the candidate second edge point 508B and the initial edge point 466. The system calculates the cost for each of paths 522, 524, 526, and 528 and selects the path with the highest cost. In some embodiments, the cost of each of the plurality of paths is determined using the cost function of Equation 1. For example, the system selects path 526 as the best path between initial edge point 466 and candidate second edge point 508B because it has the highest or lowest cost (can be highest or lowest depending on how the cost function is optimized). The system determines (560) a best path based on a plurality of paths between each candidate edge point and the reference point (e.g., paths 532 for candidate second edge point 508A, path 534 for candidate second edge point 508C, path 536 for candidate second edge point 508D, path 538 for candidate second edge point 508E, and path 540 for candidate second edge point 502). The system can use any number of candidate edge points. For example, the system can be configured to calculate forty or eighty candidate edge points along line 506. The system can calculate any number of paths between each candidate path and the previous reference point (e.g., initial edge point 466).

The system calculates (562) a path metric for each best path (the path metric calculation is explained in further detail with reference to FIGS. 6A-9). Based on the path metric value for each best path (e.g., paths 532 through 540 and path 526), the system determines an optimal candidate path, in this example path 534. Path 534 is the optimal candidate path because in this example, path 534 has the highest path metric value. The highest path metric value can indicate, for example, that path 534 is the best fitting contour line between the initial point 466 and the candidate second edge point 508C. After determining path 534 is the optimal candidate portion of the contour (i.e., portion of the second contour 460), the system stores information regarding the optimal candidate path (e.g., in the data storage 114 of FIG. 1). The candidate second edge point 508C can be stored as the second edge point 510 (i.e., path 534 is stored as a portion of the second contour 460).

Figure 8:
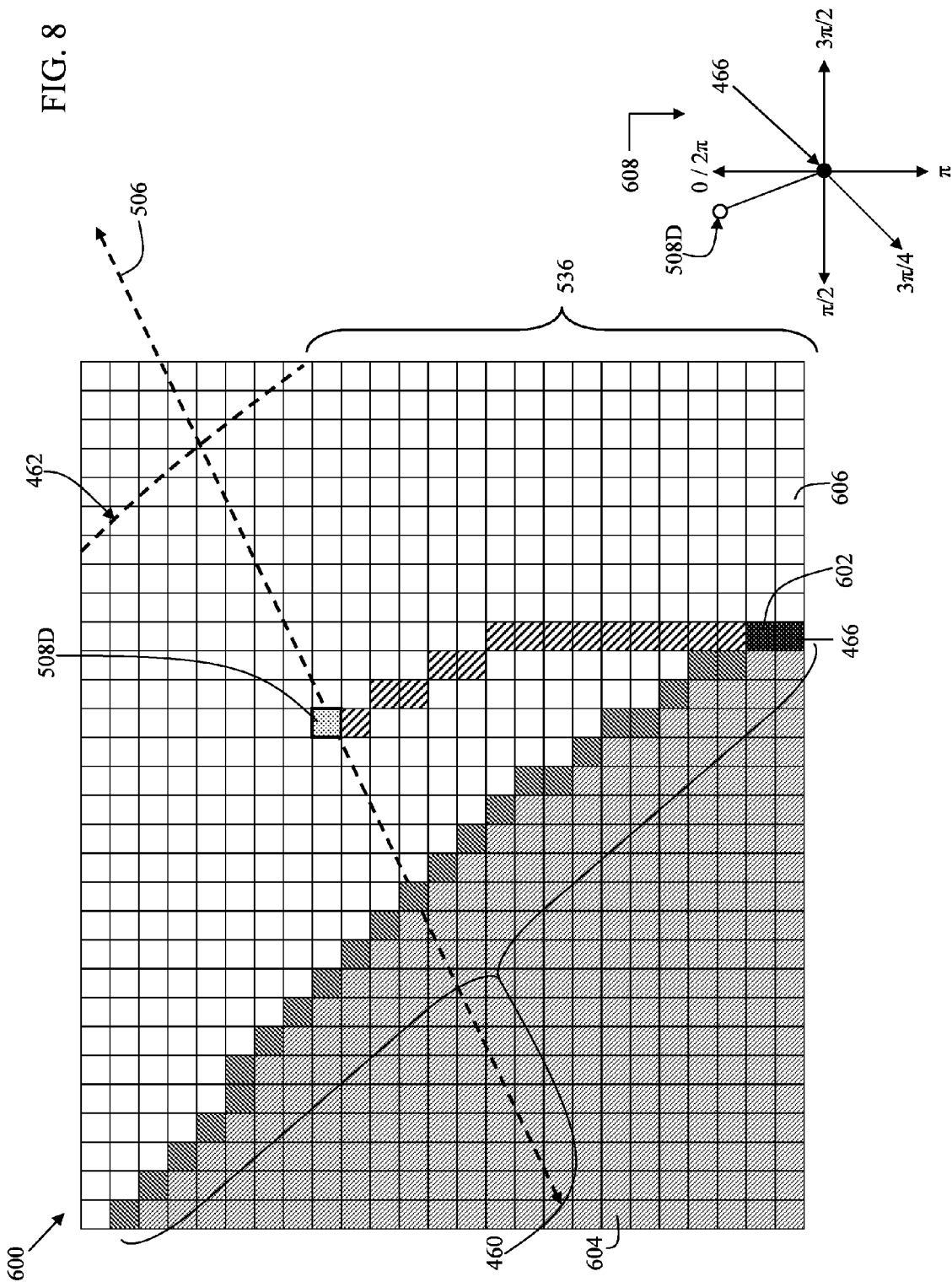
FIG. 8 shows a pixilated view of the second cross-sectional image for automatic image segmentation using contour propagation.

FIG. 8 shows a pixilated view 600 of the second cross-sectional image 454 of FIG. 6C for automatic image segmentation using contour propagation. The pixilated view 600 is used in conjunction with FIG. 9 to describe an exemplary calculation of a path metric. The pixilated view 600 includes a portion of the second contour 460 and the superimposed first contour 462. Line 506 extends through the candidate second edge point 508D. Path 536 extends from the initial point 466 to the candidate second edge point 508D. Pixel 602 is a pixel of path 536 which also overlaps a pixel of the second contour 460. Pixel 604 is within the second contour 460. Pixel 606 is outside the second contour 460.

Figure 9:
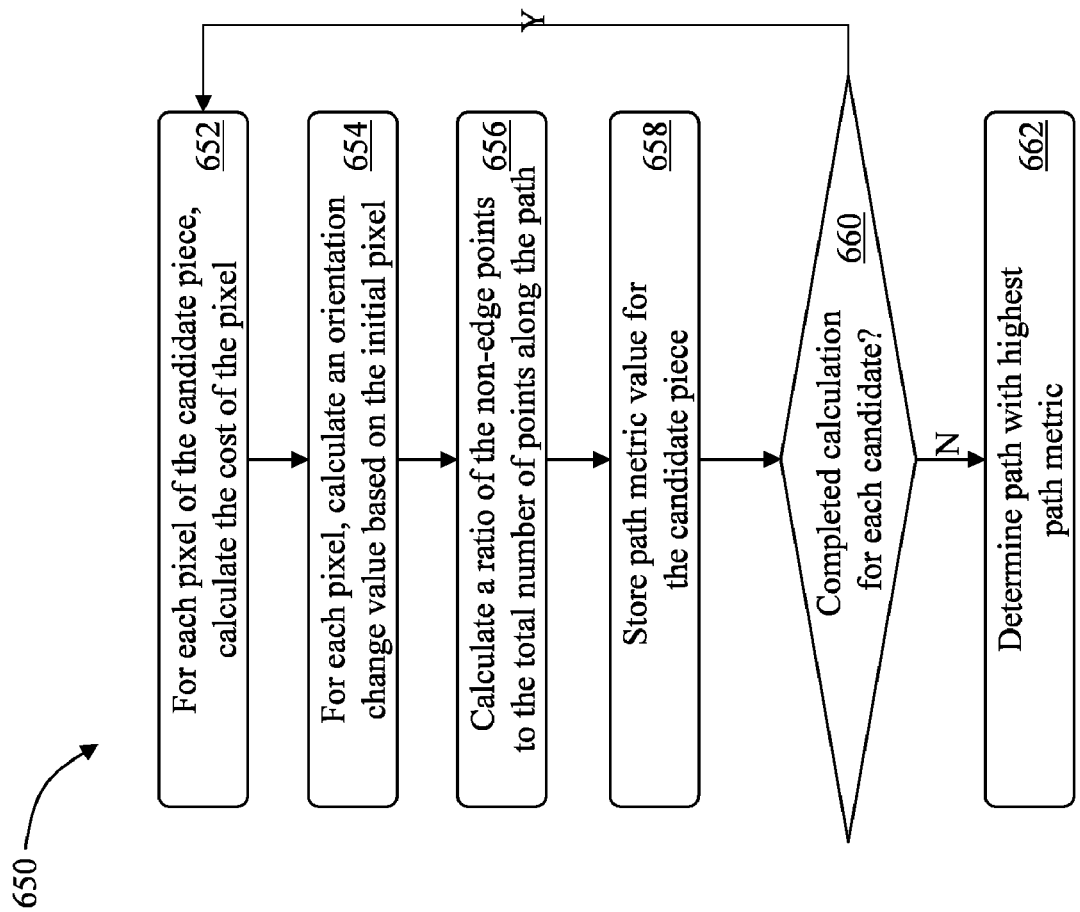
FIG. 9 is a flow chart of the path metric calculation for automatic image segmentation using contour propagation.

FIG. 9 is a flow chart 650 of the path metric calculation for automatic image segmentation using contour propagation. Equation 5 is used to calculate the path metric:

$$PathMetric = \sum_{x,y \in path} C'(x, y) \cdot W(x, y) \cdot \frac{1 - P_{nonedge}}{1 + P_{nonedge}} \quad \text{Equation 5}$$

where:

$C'(x,y)$ is the cost function used to evaluate if the pixel located at $(x,y)$ is on an edge;

$W(x,y)$ evaluates the orientation change of the contour pieces, calculated with Equation 6; and $P_{nonedge}$ evaluates the distribution of the edge point along the path, calculated with Equation 7.

$$W(x, y) = \begin{cases} 1 & Orient(x, y) - Orient(x_0, y_0) < \pi/2 \\ 0 & \pi/2 \leq Orient(x, y) - Orient(x_0, y_0) < 3\pi/4 \\ -1 & Orient(x, y) - Orient(x_0, y_0) \geq 3\pi/4 \end{cases} \quad \text{Equation 6}$$

where:

$Orient(x,y)$ is the orientation of the pixel at point $(x,y)$; and $Orient(x_0,y_0)$ is the orientation of the pixel at the starting pixel of the candidate path $(x_0,y_0)$.

$$P_{nonedge} = \frac{P_{not}}{P_{total}} \quad \text{Equation 7}$$

where:

$P_{not}$=the number of points which are not edge points, calculated by comparing the $C'(x,y)$ value for each point $(x,y)$ against a predetermined threshold; and $P_{total}$=the total number of points along the candidate path.

In process 650, the system calculates (652) the cost, $C'(x, y)$, of each pixel of the candidate piece (e.g., path 536). In some embodiments, $C'(x,y)$ is calculated with templates (i.e., the templates from FIG. 4). For example, the group 400 of templates can detect an edge with eight different directions. The granularity of detection can be increased by using more templates with different pixel directions. For example, sixteen templates could detect an edge with sixteen different directions.

The system calculates (654) an orientation change value for each pixel. The orientation change is determined between the pixel the system is evaluating and the originating pixel for the candidate path (e.g., the initial edge point 466 for path 536). $W(x,y)$ evaluates the orientation change of the pixels comprising the contour pieces. If the orientation change is less than $\pi/2$ (i.e., $\pi/3$), $W(x,y)$ is 1. If the orientation change is greater than or equal to $\pi/2$ but less than $3\pi/4$ (i.e., $3\pi/5$), $W(x,y)$ is 0. This can, for example, remove the contribution of edge cost at point $(x, y)$. If the orientation change is greater than or equal to $3\pi/4$ (i.e., $\pi$), which means the contour goes forward then goes backward, $W(x,y)$ is $-1$. A larger orientation change can decrease the value of PathMetric for Equation 5 as a penalty of the large orientation change. Degree axes 608 indicate a orientation change from 0 to $\pi/2$ to $3\pi/4$ to $\pi$ and lastly to $5\pi/4$. For example, the system calculates the orientation change from the initial pixel 466 to the candidate second edge point 508D to be 20 degrees. Because $\pi/9$ is less than $\pi/2$, $W(x,y)$ is 1. The orientation change is evaluated for all pixels (e.g., for all the pixels along path 536).

The system calculates (656) a ratio of the non-edge points to the total number of points along the candidate path. The ratio can be any ratio based on pixels of a cross-sectional image (e.g., a ratio of edge pixels, a ratio of non-edge pixels, a ratio of total pixels, and/or the like). $P_{nonedge}$ evaluates the distribution of the edge point along the path. If $C'(x,y)$ is higher than a preset threshold, then pixel $(x,y)$ is an edge point, else pixel $(x,y)$ is not an edge point. For example, the system uses the templates to calculate $C'(x,y)$ for each pixel along path 536. The system compares the cost $C'(x,y)$ to the preset threshold for each pixel. The ratio for line 536 is 15/17 (i.e., the pixel of line 536 which overlaps the initial edge point 466 and pixel 602 are the only two edge points out of the seventeen pixels which comprise line 536). The higher the number of non-edge points, the lower the value of $(1-P_{nonedge})/(1+P_{nonedge})$. The value of $(1-P_{nonedge})/(1+P_{nonedge})$ can be a weight factor.

The system stores (658) the value for each pixel (e.g., in the storage 114 of FIG. 1). The system calculates (660) the path metric for each remaining path (e.g., paths 534, 536, 538, 540, and 526 of FIG. 6C). The system determines the optimal path (e.g., path 534) as the path with the highest path metric value. Advantageously, computation proceeds in a two-step function. The path with the highest cost is computed between each candidate edge point and the seed point. Each path is evaluated against the other paths in the plurality of paths based on the path metric. The system selects the path from the plurality of paths with the highest path metric to represent a portion of the contour.

Figure 10A:
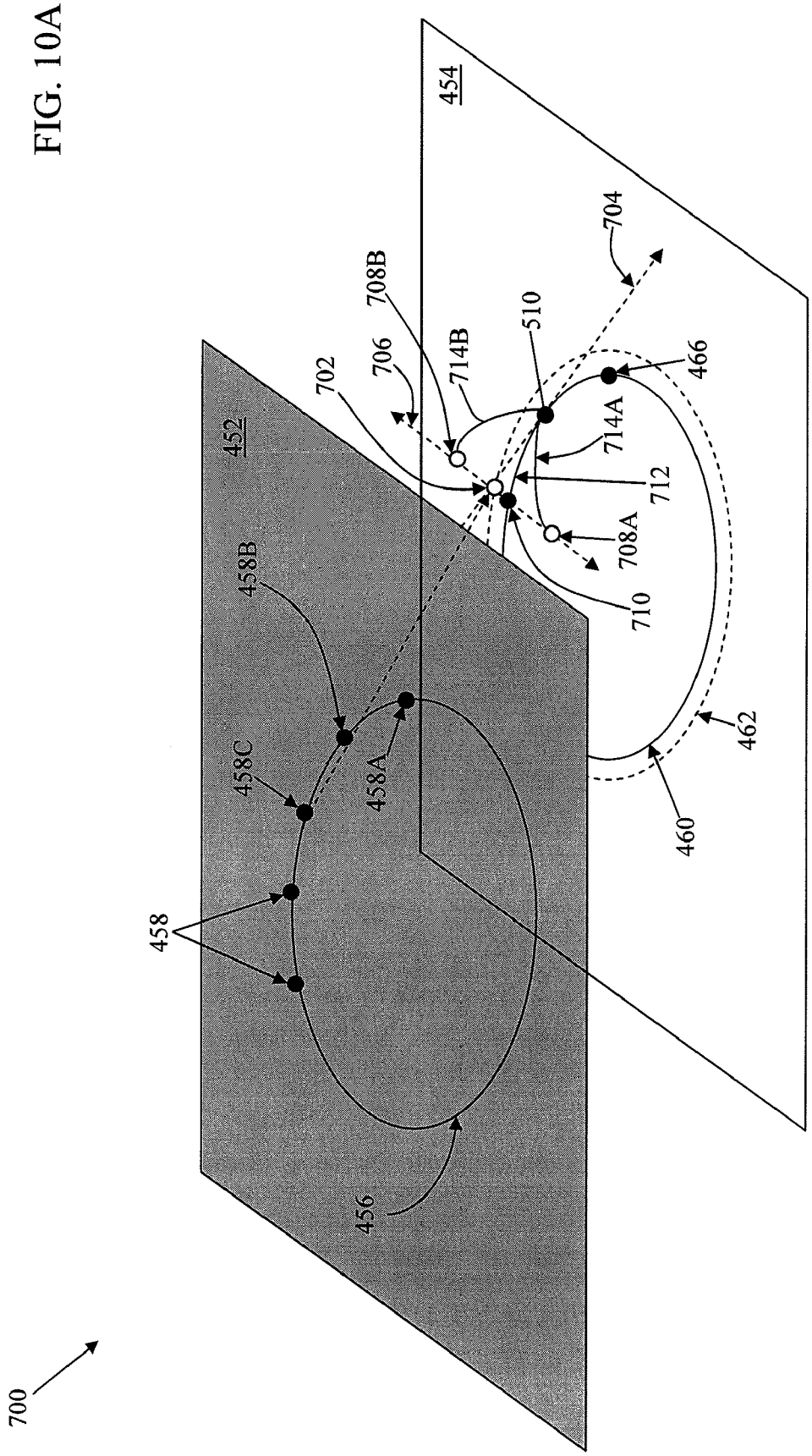
FIG. 10A shows an exemplary depiction of the third edge point calculation for automatic image segmentation using contour propagation.

FIG. 10A shows an exemplary depiction 700 of the third edge point calculation for automatic image segmentation using contour propagation. With reference to FIG. 6A, the depiction 700 includes the first cross-sectional image 452 and the adjacent second cross-sectional image 454. The first cross-sectional image 452 includes the first contour 456. The first cross-sectional image 452 has control points 458 around the first contour 456. The control points 458 include the initial control point 458A, second control point 458B, and third control point 458C. The second cross-sectional image 454 includes the second contour 460. The superimposed first contour 462 is an outline of where the first contour 456 is in relation to the second contour 460 when the first cross-sectional image 452 and second cross-sectional image 454 are aligned vertically.

The second cross-sectional image 454 includes the initial edge point 466 (e.g., as calculated based on FIGS. 4-5C) and the second edge point 510 (e.g., as calculated based on FIGS. 6A-9). The second cross-sectional image 454 includes the third seed point 702 (i.e., the location of the third control point 458C along the superimposed first contour 462). Line 704 passes through the second edge point 510 and the third seed point 702. Line 706 passes through the third seed point 702 and is perpendicular to line 704. Candidate second edge points 708A and 708B are located along line 706. Third edge point 710 (which is also a candidate edge point before determining it is the third edge point) is located along the second contour 460. The optimal path 712 is along the second contour between the second edge point 510 and the third edge point 710. Other candidate paths (e.g., path 714A to candidate third edge point 708A and path 714B to candidate third edge point 708B) extend from the second edge point 510.

Figure 10B:
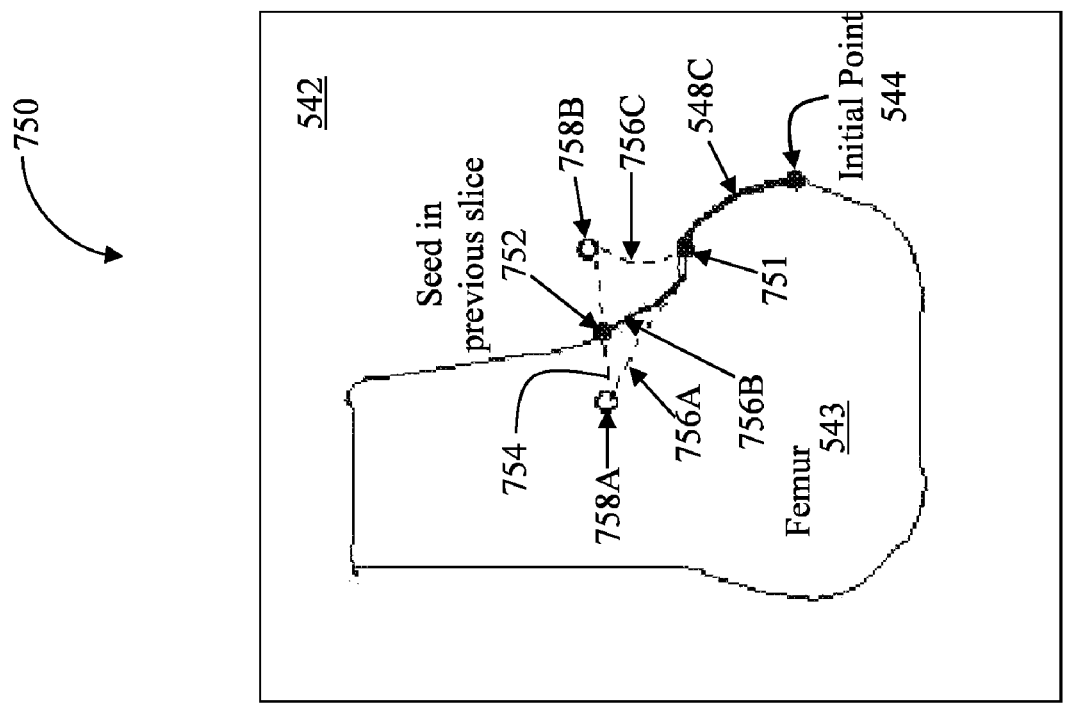
FIG. 10B shows an exemplary third edge point calculation for a cross-sectional image of a femur bone for automatic image segmentation using contour propagation.

FIG. 10B shows an exemplary third edge point calculation for a cross-sectional image 542 of a femur bone 543 of FIG. 6D for automatic image segmentation using contour propagation. The cross-sectional image 542 includes the initial point 544. The optimal path 548C extends from the initial point 544 to the second edge point 751. The seed in the previous slice 752 is superimposed onto the cross-sectional image 542. Line 754 extends through seed 752 based on the second edge point 751. Candidate paths 756A, 756B, and 756C extend to candidate point 758A, seed point 752, and candidate point 758B, respectively.

For FIGS. 10A and 10B, the optimal path (e.g., path 712 and 756B, respectively) is calculated in the same manner as described with reference to FIGS. 6A-9. The calculations are based on the second edge point (e.g., point 510 and 751, respectively) instead of the initial edge point. The system continues iteratively for each newly established edge point. When the system reaches the initial edge point, the control points from the first contour (e.g., first contour 456) have been completely propagated to the adjacent contour (e.g., second contour 460).

Figure 10C:
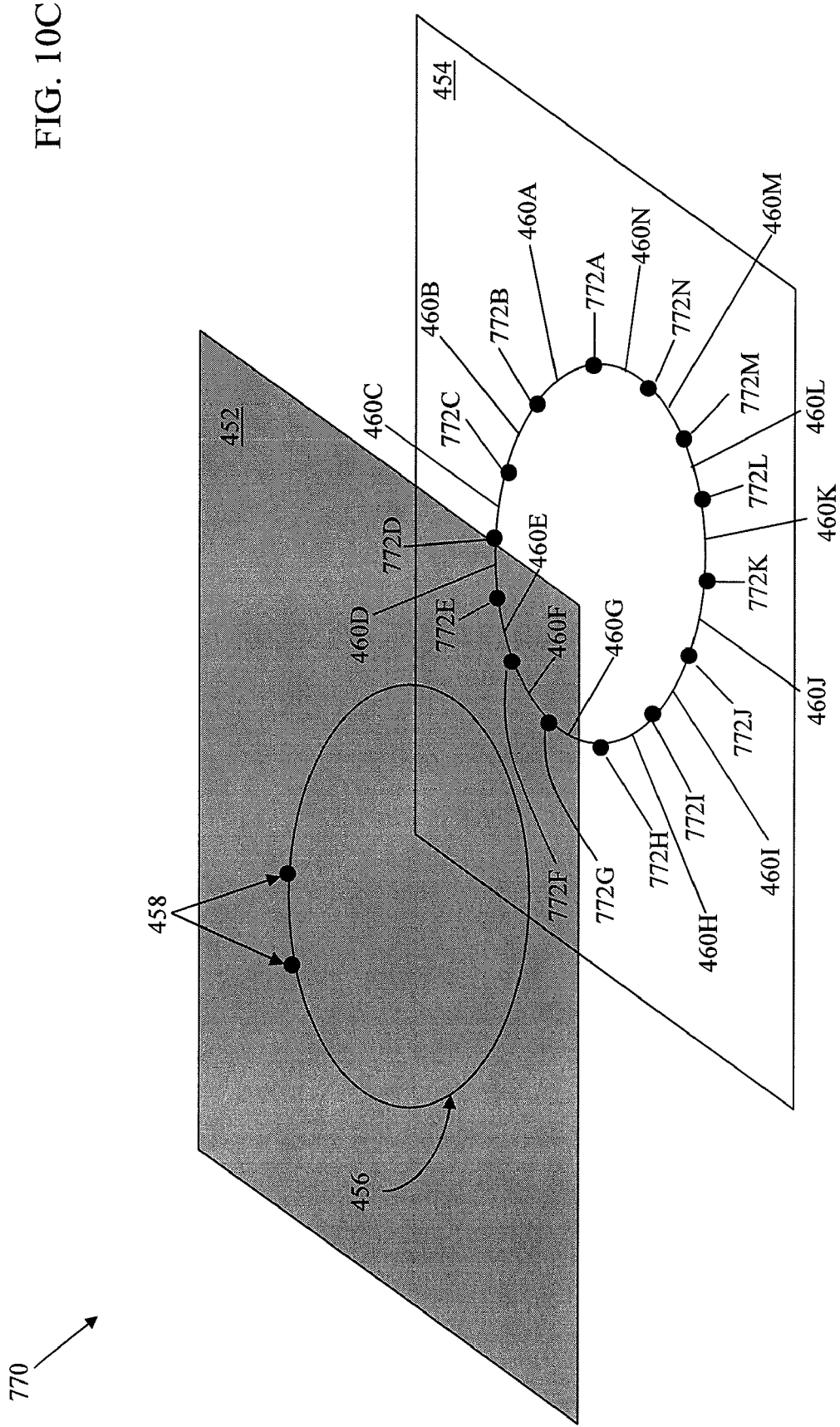
FIG. 10C shows a completed contour propagation for a cross-sectional image of a femur bone for automatic image segmentation.
Figure 10D:
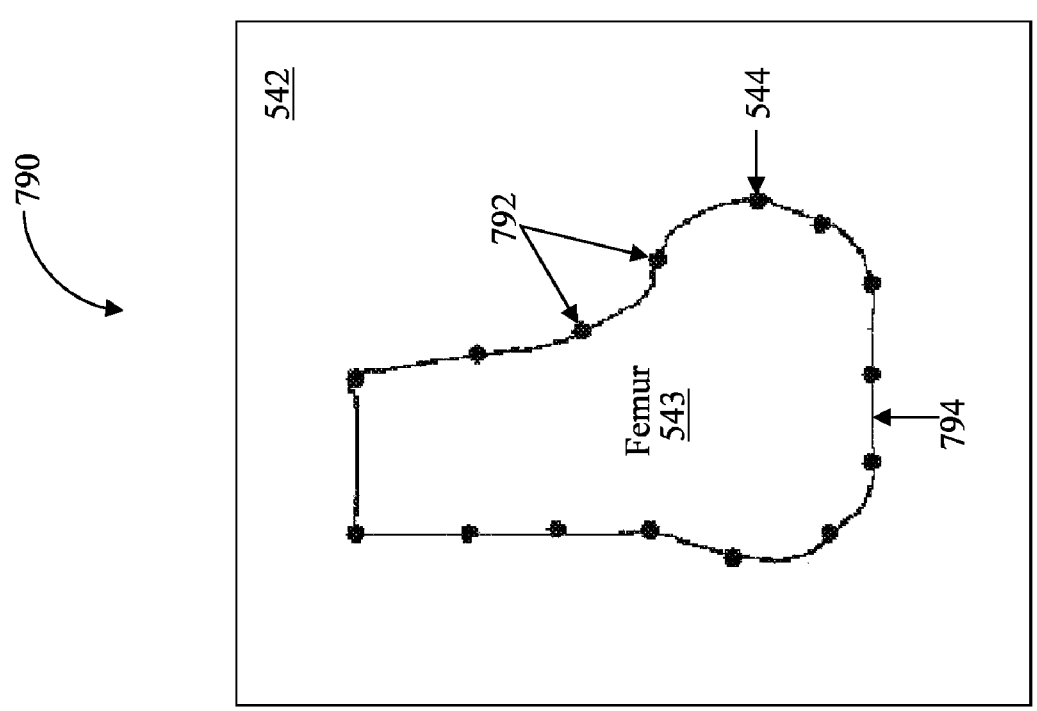
FIG. 10D shows an exemplary completed contour propagation for a cross-sectional image of a femur bone for automatic image segmentation.

FIG. 10C shows a completed contour propagation 770 for a cross-sectional image of a femur bone for automatic image segmentation. With reference to FIG. 6A, the depiction 770 includes the first cross-sectional image 452 and the adjacent second cross-sectional image 454. The first cross-sectional image 452 includes the first contour 456. The first cross-sectional image 452 has control points 458 around the first contour 456. The second cross-sectional image 454 includes the second contour 460. The second contour 460 includes edge points 772 (i.e., edge points 772A through edge points 772N). The edge points 772 make the completed contour 460 (i.e., optimal paths 460A through 460N). The techniques described herein are not limited to the number of control points 458 or edge points 772 shown in FIG. 10C. FIG. 10D shows an exemplary completed contour propagation 790 for a cross-sectional image of a femur bone 543 for automatic image segmentation. The cross-sectional image 542 includes the initial point 544. Edge points 792 comprise the completed contour 794. Contours and their associated edge points can be propagated to subsequent adjacent cross-sectional image. For example, in FIG. 10C, the contour points 772 can be propagated to a cross-sectional image adjacent to the second cross-sectional image 454.

Figure 11B:
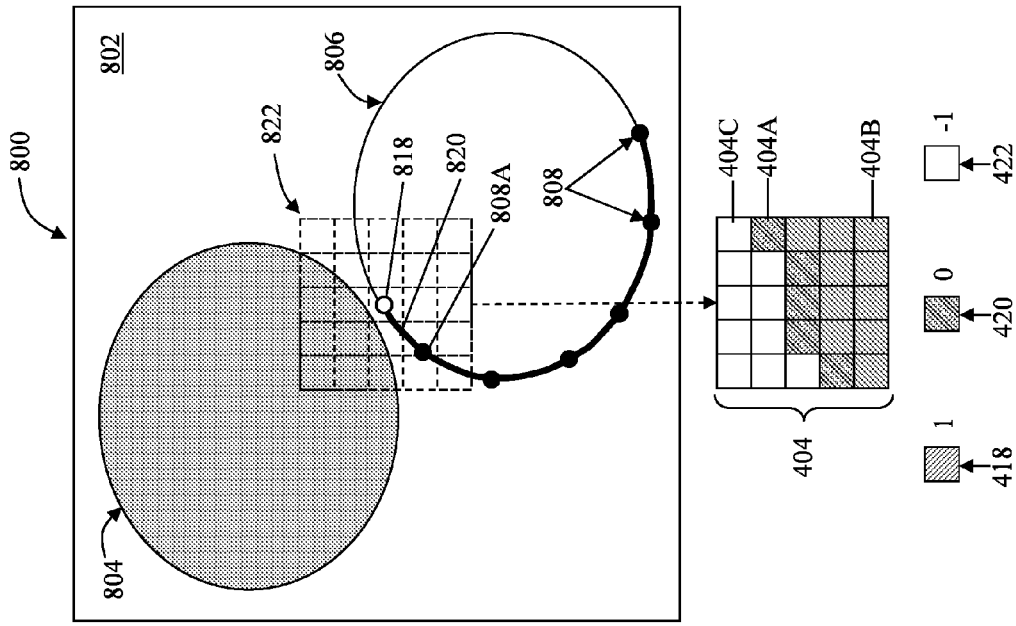
FIGS. 11A and 11B show an exemplary boundary snapping solution for a cross-sectional image of a femur bone for automatic image segmentation.
Figure 11A:
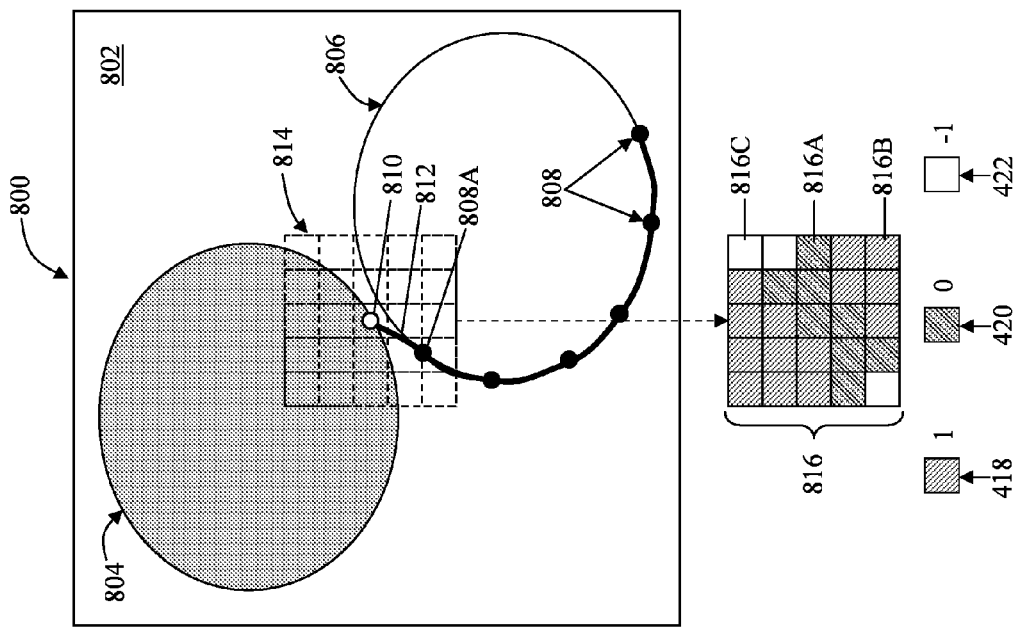

FIGS. 11A and 11B show an exemplary boundary snapping solution 800 for a cross-sectional image of a femur bone for automatic image segmentation. Referencing FIGS. 11A and 11B, the boundary snapping solution 800 includes a cross-sectional image 802 with a first contour 804 and a second contour 806. The second contour 806 includes edge points 808, including edge point 808A. Candidate edge point 810 is located on the edge of the first contour 804. The candidate path 812 extends from edge point 808A to edge point 810. Referencing FIG. 11A, blank template 814 is located over the pixel representative of candidate edge point 810. Template 816 represents a template that would be the best-fit template for the blank template 814. Pixel 816A has a weight 420 of 0. Pixel 816A can have a weight of 0 because it is located along an edge point. Pixel 816B has a weight 418 of 1. Pixel 816B can have a weight of 1 because it is located inside the body of a contour. Pixel 816C has a weight 422 of 1. Pixel 816C can have a weight of −1 because it is located outside the body of a contour.

Referencing FIG. 11B, candidate edge point 818 is located on the edge of the second contour 806. The candidate path 820 extends from edge point 808A to edge point 818. While FIGS. 11A and 11B include the same cross-sectional image 802 and the first contour 804 and the second contour 806, different templates are used to fill the blank template (blank template 814 for FIG. 11A and blank template 822 for FIG. 11B). Pixel 404A of template 404 has a weight 420 of 0. Pixel 404A can have a weight of 0 because it is located along an edge point. Pixel 404B has a weight 418 of 1. Pixel 404B can have a weight of 1 because it is located inside the body of a contour. Pixel 404C has a weight 422 of −1. Pixel 404C can have a weight of −1 because it is located outside the body of a contour.

Calculating the costs for the path metric using templates (e.g., template group 400 of FIG. 4) advantageously avoids heavily weighting a candidate path (e.g., path 812) which "snaps" from the first contour 804 to the second contour 806. To avoid associating a high weight with pixel 810, the group of templates used by the system does not include a template with the same pixel configuration as template 816. By not including template 816, the other templates will not match up exactly with the group of pixels represented by the blank template 814, so the system will not achieve the highest potential weight for pixel 810. The calculation of the path metric does not associate a strong weight for pixel 810, so pixel 810 is not considered to be a good edge point. Of the group 400 of templates, template 404 is the best fit for pixel 818, so template 404 achieves the highest potential value for pixel 818. The system (e.g., the image segmentation system 102) selects pixel 818 over pixel 810 because pixel 818 is associated with the highest weight. The system calculates path 820 as the optimal path from point 808A, designating point 818 as an edge point of contour 806.

Each path chosen to represent a portion of the contour corresponds to the strongest edge that has the minimal cost obtained from the path map. Additionally, the path metric is applied to evaluate each candidate path. The optimal path is the path with the largest path metric. The proposed path metric considers the orientation of the gradient and the distribution of the edge points. The path metric can have a higher possibility of picking the right edge point by not relying on distribution of the edge points alone.

The contour propagation algorithm sets the end point of a first contour piece as the starting point of a second contour piece and moves the second live seed point along the contour as described above. For each new seed point, the algorithm calculates the candidate path based on the path map using the cost function of Equation 1 and the path metric of each candidate path calculated with Equation 5. The contour goes along the boundary of the object and eventually is closed by the initial point as shown in FIGS. 10C and 10D. For example, the algorithm determines the initial edge point A. The algorithm determines the second edge point 772B. The algorithm calculates the optimal path 460A between point 772A and 772B based on the cost function and the path metric of each path. The algorithm determines the third edge point 772C and the optimal path 460B between point 772B and point 772C. The algorithm continues calculating the optimal paths, until calculating optimal path 460N between edge point 772N and edge point 772A. Calculating contours 460A through 460N completes the contour 460.

Figure 12B:
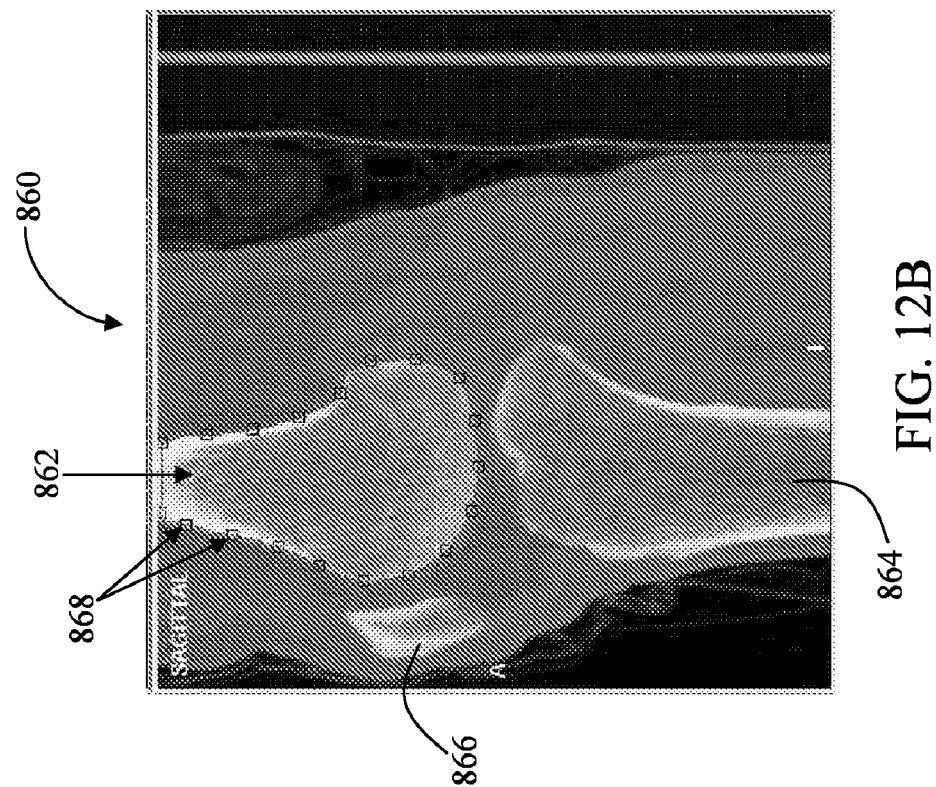
FIGS. 12A-12D show contours of a femur calculated using automatic image segmentation using contour propagation.
Figure 12A:
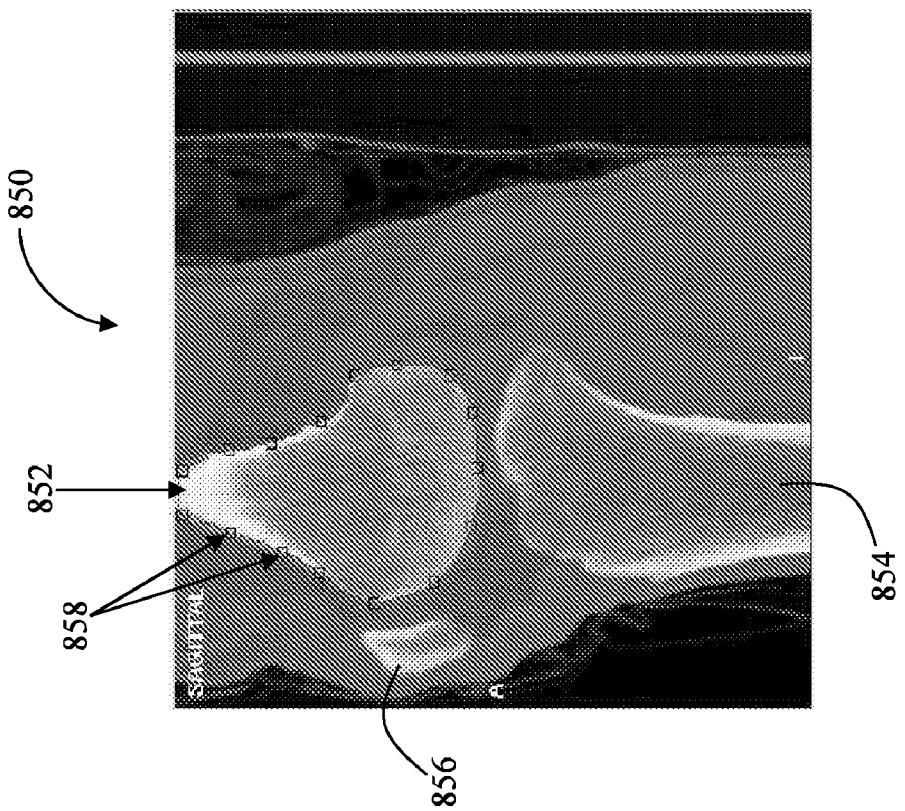

FIGS. 12A-12D show contours of a femur calculated using automatic image segmentation using contour propagation. FIG. 12A shows cross-sectional image 850 of the bones of a knee joint. Cross-sectional image 850 includes a contour of the femur 852 and tibia 854. Cross-sectional image 850 includes a contour of a knee cap or patella 856. Cross-sectional image 850 includes manually drawn control points 858 along the femur contour 852. FIG. 12B shows cross-sectional image 860 of the bones of the knee joint. Cross-sectional image 860 includes a contour of the femur 862 and tibia 864. Cross-sectional image 860 includes a contour of a knee cap or patella 866. The system uses the manually generated control points 858 of FIG. 12A to calculate the edge points of the femur contour 862. Cross-sectional image 860 includes automatically propagated contour 862 with edge points 868 along the femur contour 862 (e.g., as explained above with the description of automatic image segmentation using contour propagation).

Figure 12D:
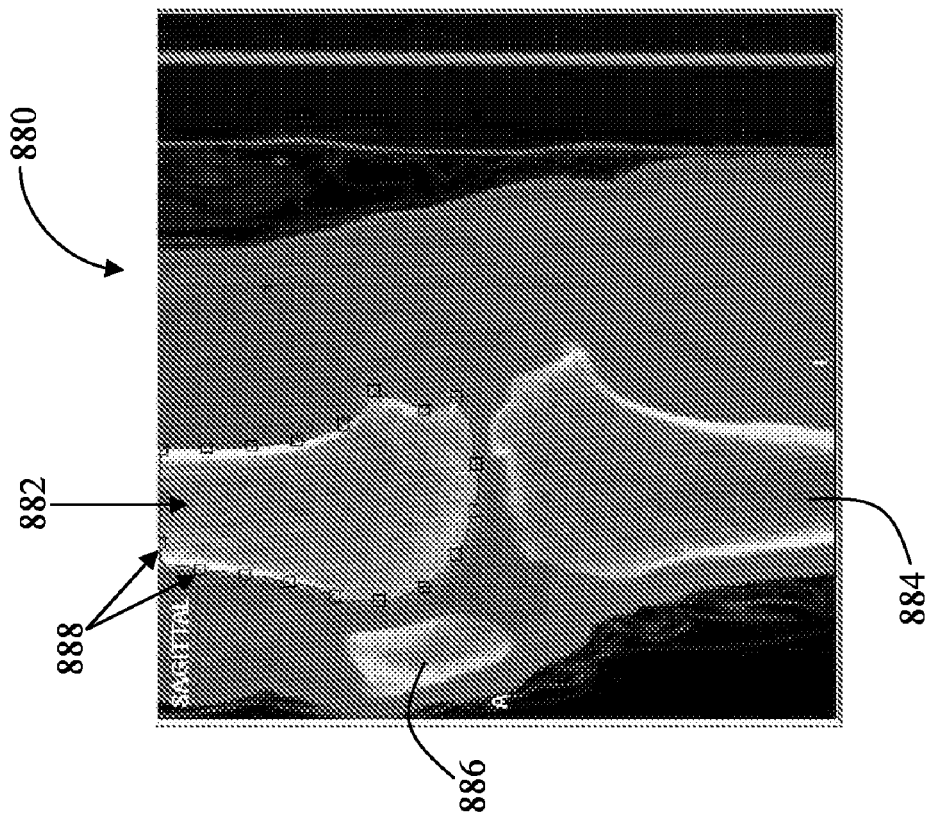
Figure 12C:
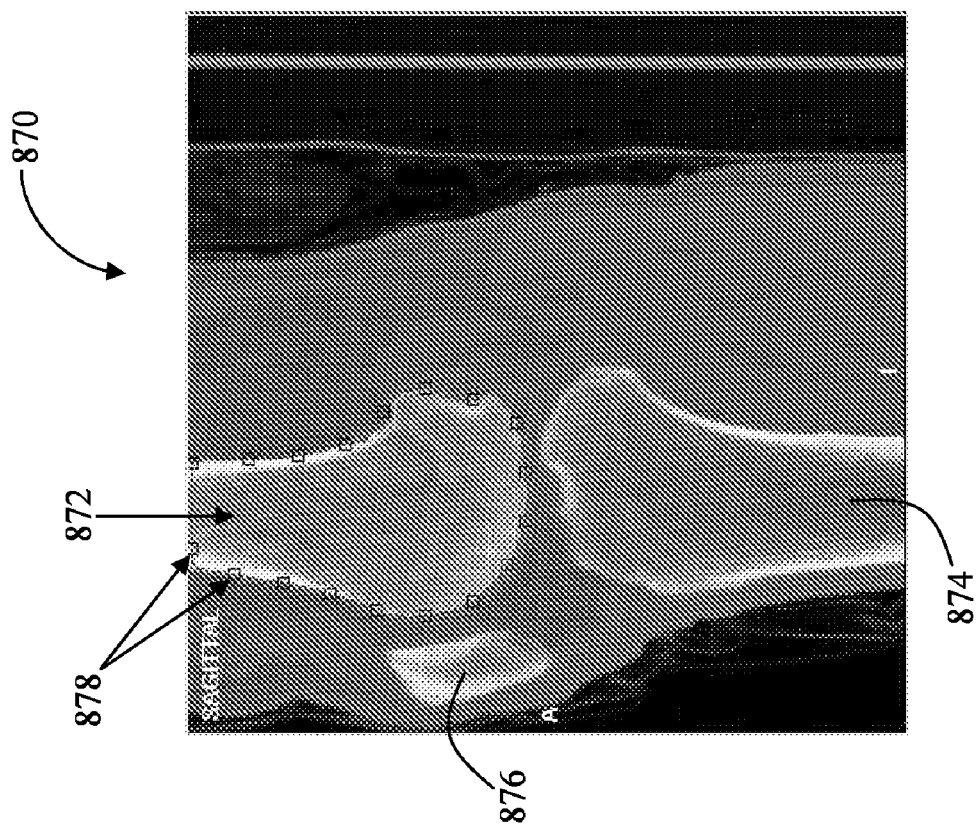

FIG. 12C shows cross-sectional image 870 of the bones of the knee joint. Cross-sectional image 870 includes a contour of the femur 872 and tibia 874. Cross-sectional image 870 includes a contour of a knee cap or patella 876. The system uses the automatically generated edge points 868 of FIG. 12B to calculate the edge points of the femur contour 872. Cross-sectional image 870 includes automatically propagated contour 872 with edge points 878 along the femur contour 872 (e.g., as explained above with the description of automatic image segmentation using contour propagation). FIG. 12D shows cross-sectional image 880 of the bones of a knee joint. Cross-sectional image 880 includes a contour of the femur 882 and tibia 884. Cross-sectional image 880 includes a contour of a knee cap or patella 886. The system uses the automatically generated edge points 878 of FIG. 12C to calculate the edge points of the femur contour 882. Cross-sectional image 880 includes automatically propagated contour 882 with edge points 888 along the femur contour 882 (e.g., as explained above with the description of automatic image segmentation using contour propagation).

Figure 13B:
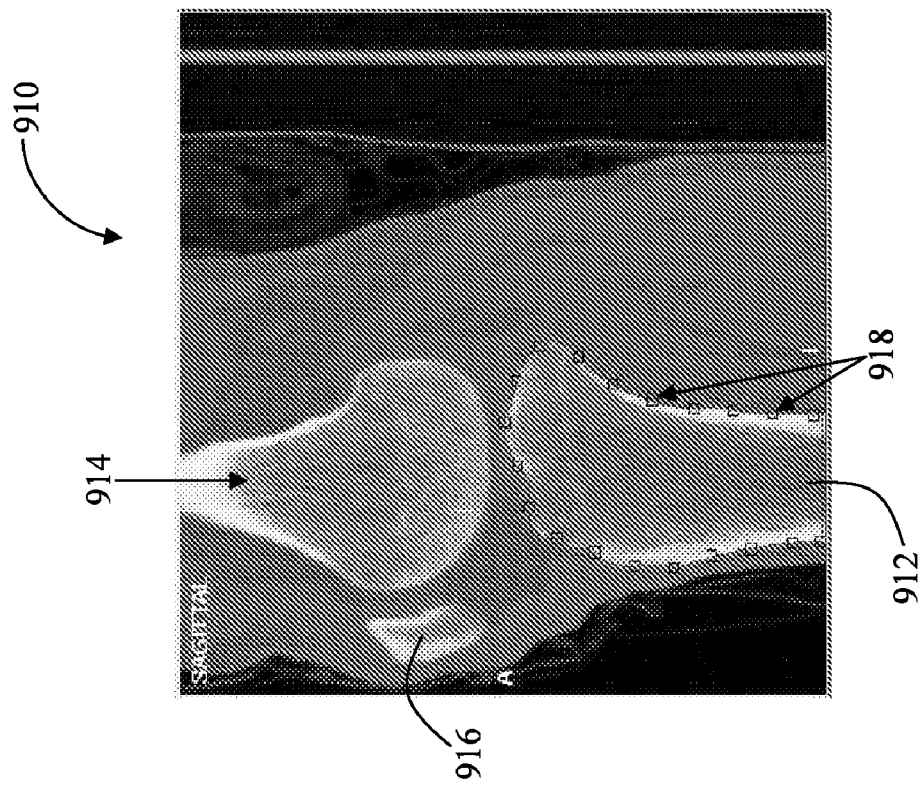
FIGS. 13A-13C show contours of a tibia calculated using automatic image segmentation using contour propagation.
Figure 13A:
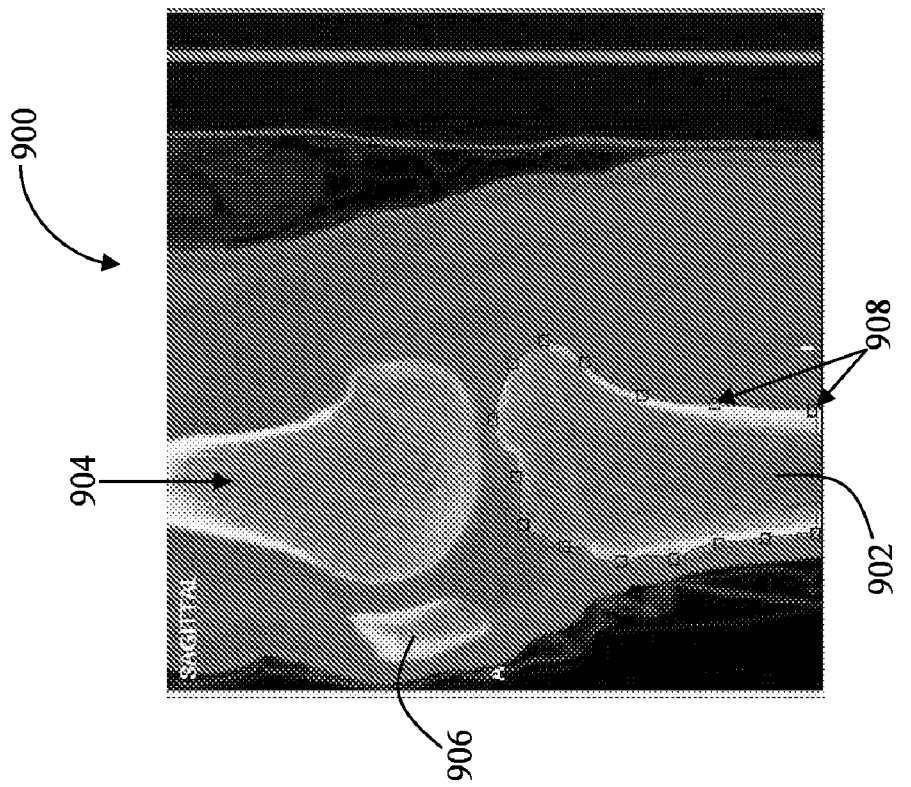
Figure 13C:
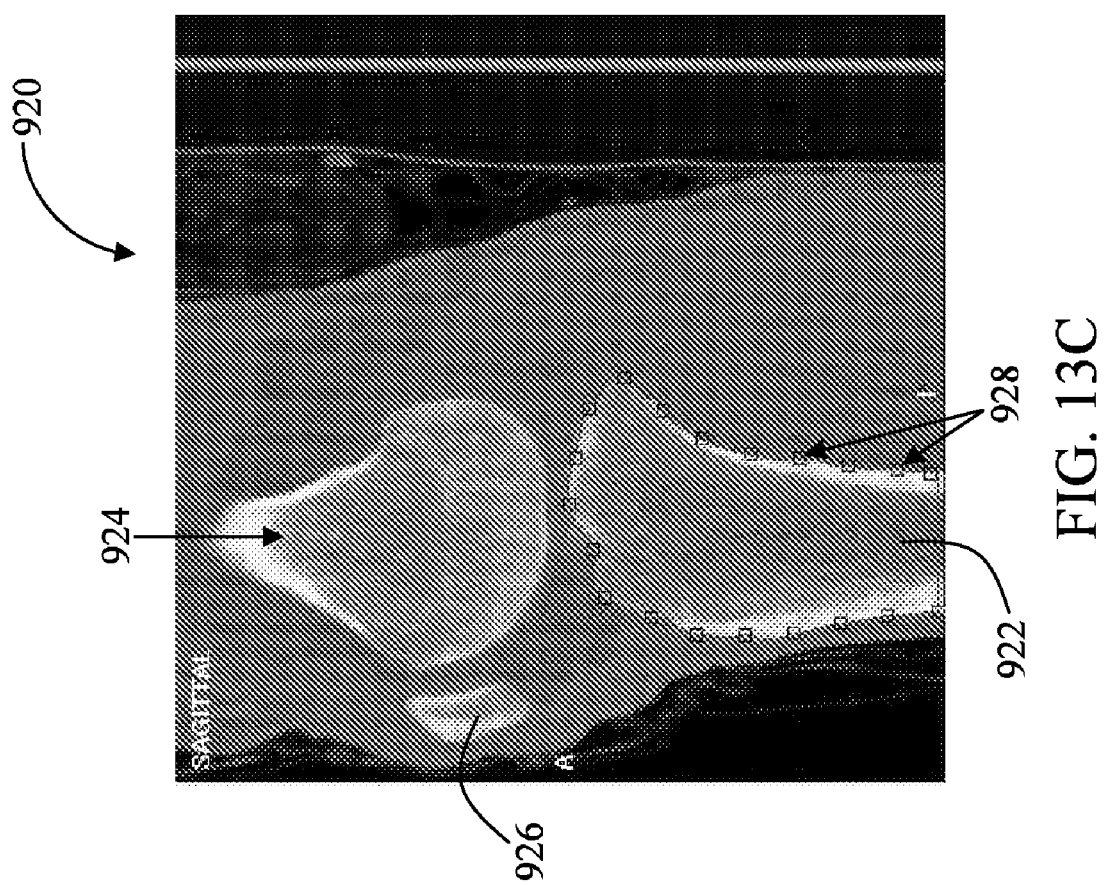

FIGS. 13A-13C show contours of a tibia calculated using automatic image segmentation using contour propagation. FIG. 13A show cross-sectional image 900 of the bones of a knee joint. Cross-sectional image 900 includes a contour of the tibia 902 and femur 904. Cross-sectional image 900 includes a contour of a knee cap or patella 906. Cross-sectional image 900 includes manually drawn control points 908 along the tibia contour 902. FIG. 13B shows cross-sectional image 910 of a the bones of knee joint. Cross-sectional image 910 includes a contour of the tibia 912 and femur 914. Cross-sectional image 910 includes a contour of a knee cap or patella 916. The system uses the manually generated control points 908 of FIG. 13A to calculate the edge points of the tibia contour 912. Cross-sectional image 910 includes automatically propagated contour 912 with edge points 918 along the tibia contour 912 (e.g., as explained above with the description of automatic image segmentation using contour propagation).

FIG. 13C show cross-sectional image 920 of the bones of a knee joint. Cross-sectional image 920 includes a contour of the tibia 922 and femur 924. Cross-sectional image 920 includes a contour of a knee cap or patella 926. The system uses the automatically generated edge points 928 of FIG. 13B to calculate the edge points of the tibia contour 922. Cross-sectional image 920 includes automatically propagated contour 922 with edge points 928 along the femur contour 922 (e.g., as explained above with the description of automatic image segmentation using contour propagation).

Advantageously, the algorithm can run very efficiently. For example, the contour propagation algorithm can be executed on a Dell Precision 380 computer, and each propagation takes from 1 to 1.5 seconds depending on the varying sizes of contours. Manual segmentation using, for example, the Live Wire technique can take about 5 seconds to produce contours on each slice. The contour propagation algorithm can be approximately 2 times faster than Live Wire for actual segmentation of a bone CT image. The contour propagation algorithm can greatly reduce the user involvement in the segmentation process.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in, special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (RAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for calculating a path metric of a candidate piece of a contour in a cross-sectional image to generate a three dimensional model using a plurality of cross-sectional images of an object, the method comprising:
   storing data indicative of the cross-sectional image;
   calculating a cost of each of a plurality of pixels associated with the candidate piece using the data, wherein the cost is representative of a likelihood the pixel is on the contour and the cost is based on one or more templates;
   calculating an orientation change value for each of the plurality of pixels associated with the candidate piece, wherein the orientation change value is calculated based on an angular change between the initial pixel of the candidate piece and the pixel, wherein the orientation change value is calculated without reference to the one or more templates;
   calculating a ratio of pixels based on pixels of the cross-sectional image;
   calculating a second ratio of one minus the calculated ratio over one plus the calculated ratio; and
   storing the path metric of the candidate piece of the contour, the value of the stored path metric being based on the calculated cost, the calculated orientation change value, and the calculated ratio.

2. The method of claim 1, further comprising calculating the path metric based on a summation of the calculated cost, the calculated orientation change value, the calculated ratio, or any combination thereof.

3. The method of claim 1, wherein calculating the cost of each pixel comprises, for each template of the one or more templates, calculating a template value by weighting the pixel and a plurality of neighboring pixels.

4. The method of claim 3, wherein the weight of each template pixel, the weight of the pixel, the weight of the plurality of neighboring pixels, or any combination thereof comprises minus one, zero, or one.

5. The method of claim 3, wherein the cost for the pixel is the highest template value associated with one of the one or more templates.

6. The method of claim 1, wherein calculating the orientation change value is based on an angular change factor.

7. The method of claim 6, wherein determining the angular change factor comprises:
   determining an orientation change between the initial pixel and the pixel is less than ninety degrees and assigning the orientation change value one;
   determining the orientation change between the initial pixel and the pixel is greater than or equal to ninety degrees but less than one hundred and thirty-five degrees and assigning the orientation change value of zero; or
   determining the orientation change between the initial pixel and the pixel is greater than or equal to one hundred and thirty-five degrees and assigning the orientation change value of negative one.

8. The method of claim 1, further comprising determining whether each pixel of the plurality of pixels is an edge point based on an intensity value.

9. The method of claim 1, wherein calculating a ratio of pixels further comprises calculating a ratio of pixels using a number of non-edge pixels over a total number of the plurality of pixels.

10. A computerized method for calculating an optimal candidate piece of a contour in a cross-sectional image to generate a three dimensional model using a plurality of cross-sectional images of an object, the method comprising:
   receiving data indicative of a first cross-sectional image and a second cross-sectional image adjacent to the first cross-sectional image, the first cross-sectional image and second cross-sectional image being in the plurality of cross-sectional images;
   using the data, calculating a plurality of paths between (a) a first point and a first candidate edge point and (b) the first point and a second candidate edge point in the second cross-sectional image;
   selecting a first candidate optimal path from the plurality of paths between the first point and the first candidate edge point and a second candidate optimal path from the plurality of paths between the first point and the second candidate edge point based on a lowest cost function that uses pixel location;
   calculating a path metric for the first candidate optimal path and the second candidate optimal path based on a path metric function that uses an orientation of a gradient of a path and a distribution of edge points of the path, the path metric function being different from the lowest cost function, wherein the path metric for each path is based on:
      an edge cost function based on a weighting for each pixel of a plurality of pixels for each respective path for each of one or more templates;
   an orientation change; and
      a number of pixels of the respective path not on the contour;
   determining the optimal candidate piece from the first candidate optimal path and the second candidate optimal path, the optimal candidate piece having a highest path metric among the first candidate optimal path and the second candidate optimal path; and
   storing data indicative of the optimal candidate piece of the contour.

11. The method of claim 10, wherein the data indicative of the optimal candidate piece of the contour is indicative of a plurality of edge points for the first cross-sectional image.

12. The method of claim 11, further comprising calculating the first point of the second cross-sectional image based on a first edge point for the first cross-sectional image from the plurality of edge points for the first cross-sectional image.

13. The method of claim 11, further comprising determining the first candidate edge point of the second cross-sectional image based on a second edge point from the plurality of edge points for the first cross-sectional image.

14. The method of claim 10, further comprising:
   calculating a seed point in the second cross-sectional image based on a control point of the first cross-sectional image;
   calculating a first line that intersects the first point and the seed point;
   calculating a second line that is perpendicular to the first line and intersects the first line at the seed point; and
   selecting the first candidate edge point and the second candidate edge point such that the first candidate edge point and the second candidate edge point are along the second line.

15. The method of claim 10, wherein the first point is based on a line from a centroid of a second contour on the second cross-sectional image.

16. The method of claim 10, wherein the first point corresponds to a point with a maximal edge cost.

17. The method of claim 10, wherein the orientation change is based on an angular change factor.

18. A system for calculating a path metric of a candidate piece of a contour in a cross-sectional image to generate a three dimensional model using a plurality of cross-sectional images of an object, the system comprising:
   a processor configured to:
      calculate a cost of each of a plurality of pixels associated with the candidate piece using data indicative of the cross-sectional image, wherein the cost is representative of a likelihood the pixel is on the contour and is based on one or more templates;
      calculate an orientation change value for each of the plurality of pixels associated with the candidate piece, wherein the orientation change value is calculated based on an angular change between the initial pixel of the candidate piece and the pixel, wherein the orientation change value is calculated without reference to the one or more templates; and
      calculate a ratio of pixels;
      calculate a second ratio of one minus the calculated ratio over one plus the calculated ratio; and
   a storage device configured to:
      store the data; and
      store the path metric of the candidate piece of the contour, the value of the stored path metric being based on the calculated cost, the calculated orientation change value, and the calculated ratio.

19. A system for calculating an optimal candidate piece of a contour in a cross-sectional image to generate a three dimensional model using a plurality of cross-sectional images of an object, the system comprising:
   a storage device configured to receive data indicative of a first cross-sectional image and a second cross-sectional image adjacent to the first cross-sectional image, the first cross-sectional image and second cross-sectional image being in the plurality of cross-sectional images; and
   store data indicative of the optimal candidate piece of the contour; and
   a processor configured to:
      using the data, calculate a plurality of paths between a first point and a first candidate edge point and the first point and a second candidate edge point in the second cross-sectional image;
      selecting a first candidate optimal path from the plurality of paths between the first point and the first candidate edge point and a second candidate optimal path from the plurality of paths between the first point and the second candidate edge point based on a lowest cost function;

calculate a path metric for the first candidate optimal path and the second candidate optimal path based on a path metric function that uses an orientation of a gradient of a path and a distribution of edge points of the path, the path metric function being different from the lowest cost function, wherein the path metric for each path is based on:

an edge cost function based on a weighting for each pixel of a plurality of pixels for each respective path for each of one or more templates;

an orientation change; and a number of pixels of the respective path not on the contour; and determine the optimal candidate piece from the first candidate optimal path and the second candidate optimal path, the optimal candidate piece having a highest path metric among the first candidate optimal path and the second candidate optimal path.

20. A non-transitory computer readable storage medium that stores a computer program for calculating a path metric of a candidate piece of a contour in a cross-sectional image to generate a three dimensional model using a plurality of cross-sectional images of an object, the computer program product including instructions being operable to cause a data processing apparatus to:

store data indicative of the cross-sectional image;

calculate a cost of each of a plurality of pixels associated with the candidate piece using the data, wherein the cost is representative of a likelihood the pixel is on the contour and the cost is based on one or more templates;

calculate an orientation change value for each of the plurality of pixels associated with the candidate piece, wherein the orientation change value is calculated based on an angular change between the initial pixel of the candidate piece and the pixel, wherein the orientation change value is calculated without reference to the one or more templates;

calculate a ratio of pixels;

calculate a second ratio of one minus the calculated ratio over one plus the calculated ratio; and store the path metric of the candidate piece of the contour, the value of the stored path metric being based on the calculated cost, the calculated orientation change value, and the calculated ratio.

21. A non-transitory computer readable storage medium that stores a computer program for calculating an optimal candidate piece of a contour in a cross-sectional image to generate a three dimensional model using a plurality of cross-sectional images of an object, the computer program product including instructions being operable to cause a data processing apparatus to:

receive data indicative of a first cross-sectional image and a second cross-sectional image adjacent to the first cross-sectional image, the first cross-sectional image and second cross-sectional image being in the plurality of cross-sectional images;

using the data, calculate a plurality of paths between a first point and a first candidate edge point and the first point and a second candidate edge point in the second cross-sectional image;

selecting a first candidate optimal path from the plurality of paths between the first point and the first candidate edge point and a second candidate optimal path from the plurality of paths between the first point and the second candidate edge point based on a lowest cost function;

calculate a path metric for the first candidate optimal path and the second candidate optimal path based on a path metric function that uses an orientation of a gradient of a path and a distribution of edge points of the path, the path metric function being different from the lowest cost function, wherein the path metric for each path is based on:

an edge cost function based on a weighting for each pixel of a plurality of pixels for each respective path for each of one or more templates;

an orientation change; and a number of pixels of the respective path not on the contour;

determine the optimal candidate piece from the first candidate optimal path and the second candidate optimal path, the optimal candidate piece having a highest path metric among the first candidate optimal path and the second candidate optimal path; and store data indicative of the optimal candidate piece of the contour.

22. A system for calculating a path metric of a candidate piece of a contour in a cross-sectional image to generate a three dimensional model using a plurality of cross-sectional images of an object, the system comprising:

means for storing data indicative of the cross-sectional image;

means for calculating a cost of each of a plurality of pixels associated with the candidate piece using the data, wherein the cost is representative of a likelihood the pixel is on the contour and the cost is based on one or more templates;

means for calculating an orientation change value for each of the plurality of pixels associated with the candidate piece, wherein the orientation change value is calculated based on an angular change between the initial pixel of the candidate piece and the pixel, wherein the orientation change value is calculated without reference to the one or more templates;

means for calculating a ratio of pixels;

means for calculating a second ratio of one minus the calculated ratio over one plus the calculated ratio; and means for storing the path metric of the candidate piece of the contour, the value of the stored path metric being based on the calculated cost, the calculated orientation change value, and the calculated ratio.

23. A system for calculating an optimal candidate piece of a contour in a cross-sectional image to generate a three dimensional model using a plurality of cross-sectional images of an object, the system comprising:

means for receiving data indicative of a first cross-sectional image and a second cross-sectional image adjacent to the first cross-sectional image, the first cross-sectional image and second cross-sectional image being in the plurality of cross-sectional images;

means for, using the data, calculating a plurality of paths between a first point and a first candidate edge point and the first point and a second candidate edge point in the second cross-sectional image;

selecting a first candidate optimal path from the plurality of paths between the first point and the first candidate edge point and a second candidate optimal path from the plurality of paths between the first point and the second candidate edge point based on a lowest cost function;

means for calculating a path metric for the first candidate optimal path and the second candidate optimal path based on a path metric function that uses an orientation of a gradient of a path and a distribution of edge points of the path, the path metric function being different from the lowest cost function, wherein the path metric for each path is based on:
an edge cost function based on a weighting for each pixel of a plurality of pixels for each respective path for each of one or more templates;
an orientation change; and
a number of pixels of the respective path not on the contour;

means for determining the optimal candidate piece from the first candidate optimal path and the second candidate optimal path, the optimal candidate piece having a highest path metric among the first candidate optimal path and the second candidate optimal path; and
means for storing data indicative of the optimal candidate piece of the contour.

* * * * *